United States Patent
Park et al.

(10) Patent No.: US 12,136,183 B2
(45) Date of Patent: Nov. 5, 2024

(54) DEMOSAICING METHOD AND DEMOSAICING DEVICE

(71) Applicant: SAMSUNG ELECTRONICS CO., LTD., Suwon-si (KR)

(72) Inventors: Soyoun Park, Seoul (KR); Byungwook Jung, Gunpo-si (KR)

(73) Assignee: Samsung Electronics Co., Ltd. (KR)

( * ) Notice: Subject to any disclaimer, the term of this patent is extended or adjusted under 35 U.S.C. 154(b) by 506 days.

(21) Appl. No.: 17/335,970

(22) Filed: Jun. 1, 2021

(65) Prior Publication Data

US 2022/0130012 A1    Apr. 28, 2022

(30) Foreign Application Priority Data

Oct. 23, 2020    (KR) .................. 10-2020-0138500

(51) Int. Cl.
    *G06K 9/00*        (2022.01)
    *G06T 3/4015*      (2024.01)
    *G06T 3/4046*      (2024.01)
    *G06T 11/00*       (2006.01)

(52) U.S. Cl.
    CPC .......... *G06T 3/4015* (2013.01); *G06T 3/4046* (2013.01); *G06T 11/001* (2013.01)

(58) Field of Classification Search
None
See application file for complete search history.

(56) References Cited

U.S. PATENT DOCUMENTS

| | | | |
|---|---|---|---|
| 7,830,426 B2 | 11/2010 | Subbotin | |
| 2019/0385325 A1 | 12/2019 | Kweon et al. | |

FOREIGN PATENT DOCUMENTS

| | | |
|---|---|---|
| CN | 201710872364 A | 1/2018 |
| CN | 201910558405 A | 10/2019 |
| JP | 6644877 | 10/2020 |
| KR | 565429 A | 6/2005 |
| KR | 1882739 B1 | 7/2018 |
| KR | 1947782 A | 8/2018 |
| KR | 102137047 B1 * | 9/2019 |
| KR | 10-2137047 | 7/2020 |

OTHER PUBLICATIONS

Michael Garbi et al., "Deep Joint Demosaiching and Denoising," 4 pages.
Soo-Chang Pei, "Effective Color Interpolation in CCD Color Filter Arrays Using Signal Correlation," IEEE Transactions on Circuits and Systems for Video Technology, Jun. 2003, 503-513, vol. 13, No. 6.
Office Action in Korean Appln. No. 10-2020-0138500, mailed on Jul. 31, 2024, 10 pages (with English translation).

* cited by examiner

*Primary Examiner* — Wei Wen Yang
(74) *Attorney, Agent, or Firm* — Fish & Richardson P.C.

(57) ABSTRACT

An artificial neural network is provided, which is configured to convert a mosaic image representable by pixels with color pixel values corresponding to a plurality of colors to a plurality of color difference images corresponding to the plurality of colors. A plurality of output color difference images corresponding to the plurality of colors are generated based on an input mosaic image representable by pixels with color pixel values corresponding to the plurality of colors using the artificial neural network. A plurality of demosaiced color images corresponding to the plurality of colors are generated by summing, pixel by pixel, the input mosaic image and each of the plurality of output color difference images.

20 Claims, 20 Drawing Sheets

Figure 9:
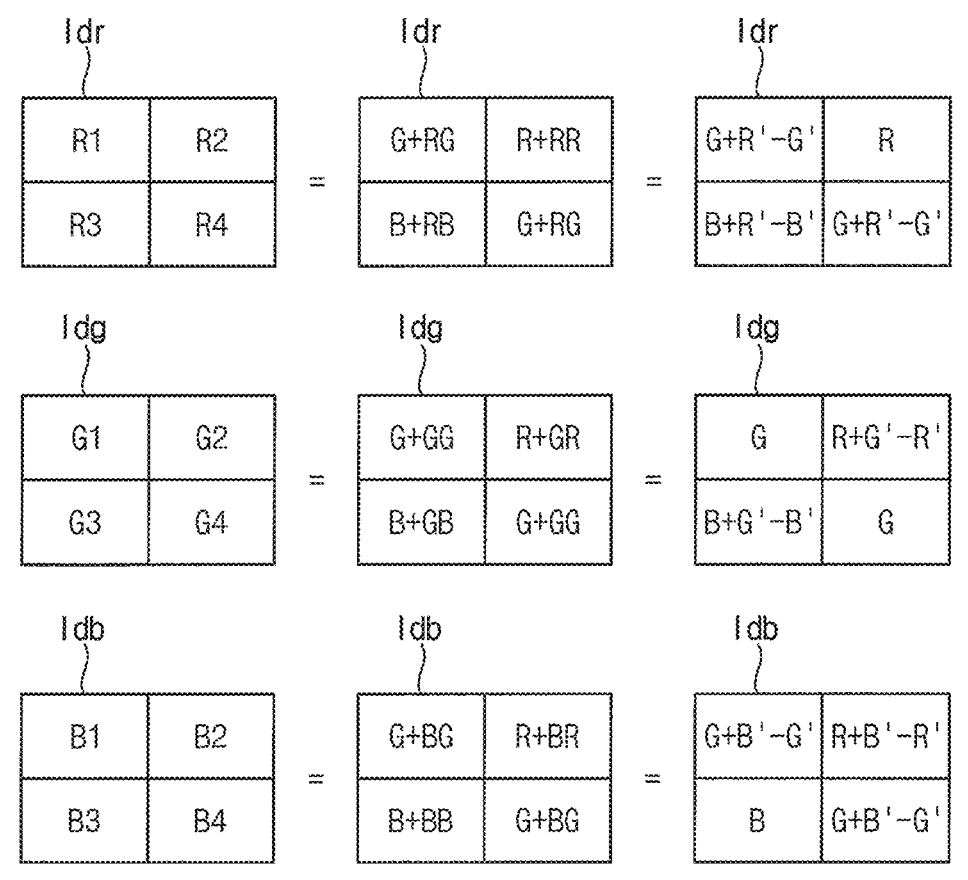

| Idr | | |
|---|---|---|
| R1 | R2 |
| R3 | R4 |

=

| Idr | |
|---|---|
| G+RG | R+RR |
| B+RB | G+RG |

=

| Idr | |
|---|---|
| G+R'−G' | R |
| B+R'−B' | G+R'−G' |

| Idg | |
|---|---|
| G1 | G2 |
| G3 | G4 |

=

| Idg | |
|---|---|
| G+GG | R+GR |
| B+GB | G+GG |

=

| Idg | |
|---|---|
| G | R+G'−R' |
| B+G'−B' | G |

| Idb | |
|---|---|
| B1 | B2 |
| B3 | B4 |

=

| Idb | |
|---|---|
| G+BG | R+BR |
| B+BB | G+BG |

=

| Idb | |
|---|---|
| G+B'−G' | R+B'−R' |
| B | G+B'−G' |

FIG. 18
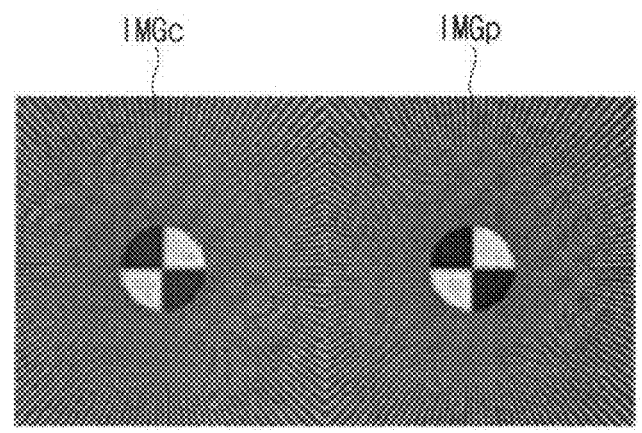
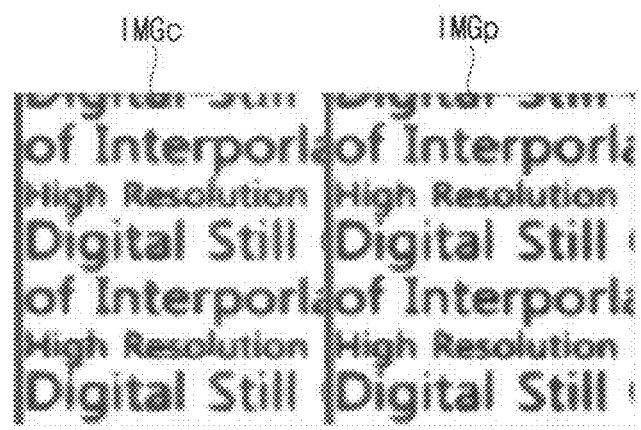

FIG. 19

|      | VLc   | VLp   |
|------|-------|-------|
| PSNR | 36.68 | 42.64 |
| SSIM | 0.958 | 0.993 |

DEMOSAICING METHOD AND DEMOSAICING DEVICE

CROSS-REFERENCE TO RELATED APPLICATION

This U.S. non-provisional patent application claims priority under 35 USC § 119 to Korean Patent Application No. 10-2020-0138500, filed on Oct. 23, 2020 in the Korean Intellectual Property Office (KIPO), the disclosure of which is incorporated by reference herein in its entirety.

BACKGROUND

1. Technical Field

Example embodiments relate generally to image processing. More particularly, example embodiments relate to a demosaicing method and demosaicing device.

2. Discussion of the Related Art

Each pixel in an image sensor detects one color, and other colors of each pixel may be obtained through interpolation of pixel values of neighboring pixels. Such color interpolation is referred to as demosaicing.

In general, a demosaicing method of reconstructing omitted color pixel values causes a block noise such as zipper effect, random color dot, etc. In addition, there is a trade-off between noise filtering and edge blurring. The interpolation of an omitted pixel value using neighboring pixel values may blur areas near edges of an image when the pixel values are interpolated near the edges in the image. Such problems result from averaging of color pixel values across the edge, such as when color pixel values on two sides of an edge sharply differ and the averaging greatly reduces the sharp difference to produce the blurring.

Most methods of demosaicing a color filter array (CFA) image or a mosaic image through linear interpolation may cause artifacts such as reduction of image detail, false color, and jagging. Errors may be accumulated because a color channel in a present stage is restored using a color channel restored by a previous stage during multi-stage processing.

SUMMARY

Some example embodiments may provide a demosaicing method based on deep learning and capable of enhancing image detail and reducing image artifact.

Some example embodiments may provide a demosaicing device performing the demosaicing method based on deep learning.

According to example embodiments, a demosaicing method based on deep learning includes providing an artificial neural network configured to convert a mosaic image representable by pixels with color pixel values corresponding to a plurality of colors to a plurality of color difference images corresponding to the plurality of colors. The demosaicing method also includes generating a plurality of output color difference images corresponding to the plurality of colors based on an input mosaic image representable by pixels with color pixel values corresponding to the plurality of colors using the artificial neural network. The demosaicing method further includes generating a plurality of demosaiced color images corresponding to the plurality of colors by summing, pixel by pixel, the input mosaic image and each of the plurality of output color difference images.

According to example embodiments, a demosaicing device includes an adder circuit and a memory that stores an artificial neural network. The artificial neural network generates a plurality of output color difference images corresponding to the plurality of colors based on an input mosaic image representable by pixels with color pixel values corresponding to the plurality of colors. The adder circuit generates a plurality of demosaiced color images corresponding to the plurality of colors by summing, pixel by pixel, the input mosaic image and each of the plurality of output color difference images.

According to example embodiments, a demosaicing method based on deep learning includes providing an artificial neural network configured to convert a mosaic image representable by pixels with red pixel values, green pixel values and blue pixel values to three color difference images corresponding to a red color, a green color and a blue color. The demosaicing method also includes generating three output color difference images corresponding to the red color, the green color and the blue color based on an input mosaic image representable by pixels with red pixel values, green pixel values, and blue pixel values using the artificial neural network. The demosaicing method further includes generating three demosaiced color images corresponding to the red color, the green color, and the blue color by summing, pixel by pixel, the input mosaic image and each of the three output color difference images.

The demosaicing method and the demosaicing device according to example embodiments may reduce image artifact and enhance image quality. Image quality may be enhanced by generating the color difference images using the artificial neural network having enhanced nonlinearity and by restoring the demosaiced color images simultaneously based on the color difference images.

BRIEF DESCRIPTION OF THE DRAWINGS

Example embodiments of the present disclosure will be more clearly understood from the following detailed description taken in conjunction with the accompanying drawings.

FIG. 4 and FIG. 5 are diagrams illustrating images in a demosaicing method based on deep learning according to example embodiments.

FIG. 7 is a diagram illustrating color patterns applicable to a demosaicing method based on deep learning according to example embodiments.

FIG. 8 and FIG. 9 are diagrams illustrating images in a demosaicing method based on deep learning according to example embodiments.

FIG. 18 and FIG. 19 are diagrams illustrating effects of a demosaicing method based on deep learning according to example embodiments.

DETAILED DESCRIPTION OF THE EMBODIMENTS

Figure 1:
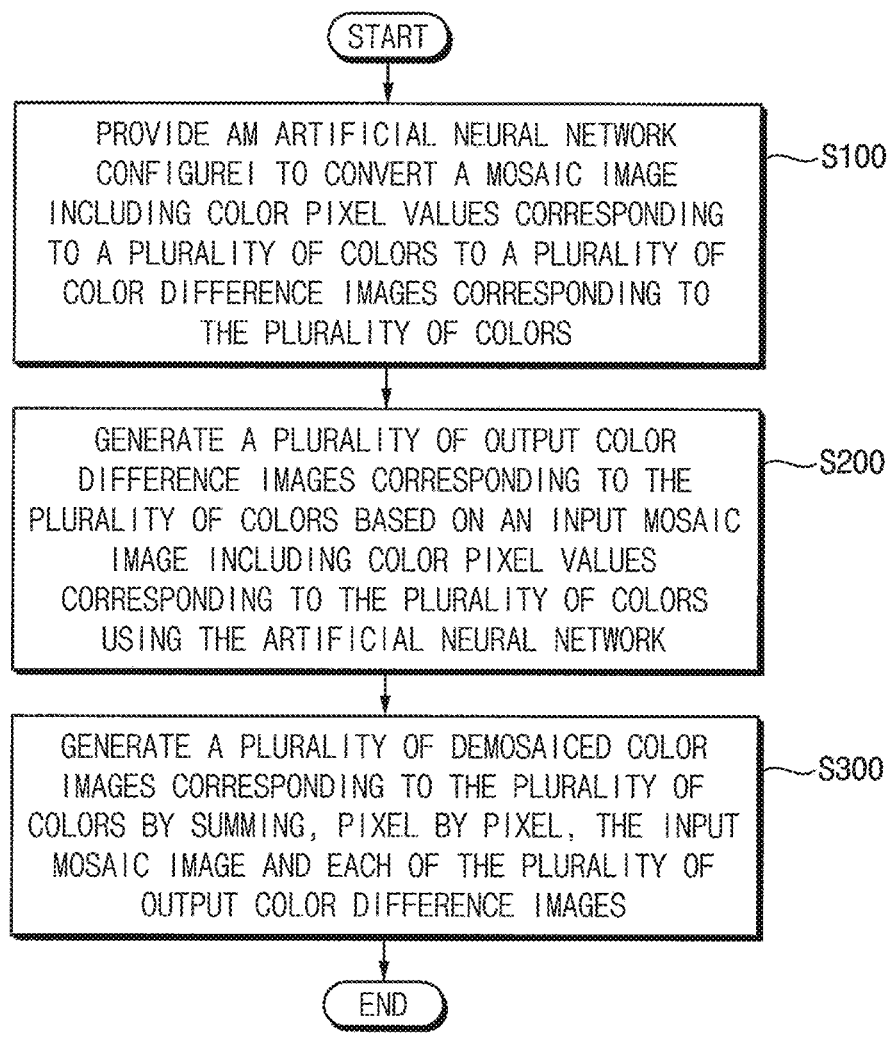
FIG. 1 is a flow chart illustrating a demosaicing method based on deep learning according to example embodiments.

Various example embodiments will be described more fully hereinafter with reference to the accompanying drawings, in which some example embodiments are shown. In the drawings, like numerals refer to like elements throughout. The repeated descriptions may be omitted.

FIG. 1 is a flow chart illustrating a demosaicing method based on deep learning according to example embodiments.

Referring to FIG. 1, an artificial neural network is provided, which is configured to convert a mosaic image representable by pixels with color pixel values corresponding to a plurality of colors to a plurality of color difference images corresponding to the plurality of colors (S100). That is, the mosaic image may be a digital image composed of pixels with color pixel values when rendered on a display, but the underlying mosaic image may be more broadly described as being representable by pixels with color pixel values. According to the present disclosure, this relationship may be stated as, for example, an image including pixel values, such as a mosaic image including color pixel values.

In some example embodiments, the artificial neural network may simultaneously generate the plurality of color difference images by performing a nonlinear operation on the color pixel values of the input mosaic image. The training of the artificial neural network will be described with reference to FIG. 10 through FIG. 17.

A plurality of output color difference images corresponding to the plurality of colors are generated based on an input mosaic image representable by pixels with color pixel values corresponding to the plurality of colors using the artificial neural network (S200). That is, the artificial neural network is applied to the input mosaic image to generate the plurality of output color difference images.

With respect to color difference pixel values of the color difference image corresponding to a first color, the color difference pixel value corresponding to a first color pixel value of the input mosaic image may have a value of zero, and the color difference pixel value corresponding to a second color pixel of the input mosaic image may have a value corresponding to a difference between a first color component and a second color component. The color difference pixel values included in the output color difference images will be described below with reference to FIG. 4 and FIG. 8.

A plurality of demosaiced color images corresponding to the plurality of colors are generated by summing, pixel by pixel, the input mosaic image and each of the plurality of output color difference images (S300).

In some example embodiments, the color pixel values of the plurality of demosaiced color images may be generated such that each color pixel value of the plurality of demosaiced color images corresponds to a sum of each color difference pixel value of the plurality of output color difference images and each color pixel value of the input mosaic image. The restoring of the plurality of demosaiced color images using the plurality of output color difference images will be described with reference to FIG. 5 and FIG. 9.

Figure 2:
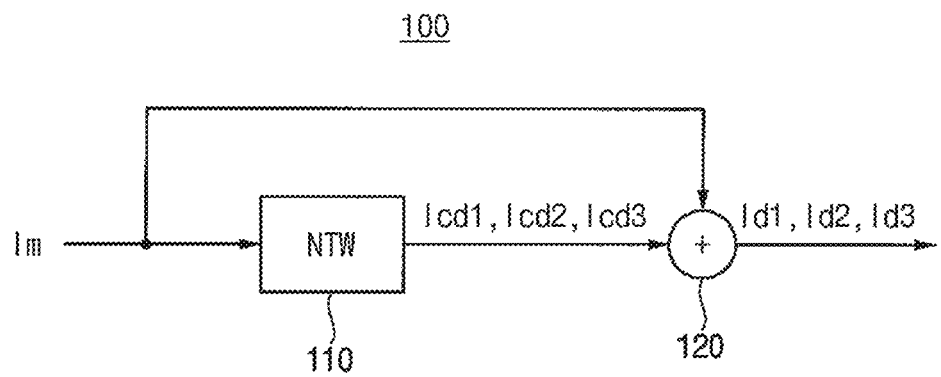
FIG. 2 is a diagram illustrating a demosaicing device according to example embodiments.

FIG. 2 is a diagram illustrating a demosaicing device according to example embodiments.

Referring to FIG. 2, a demosaicing device 100 may include an adder circuit 120 and a memory that stores an artificial neural network 110 (NTW).

As will be described below with reference to FIG. 10 through FIG. 17, the artificial neural network 110 may convert a mosaic image representable by pixels with color pixel values corresponding to a plurality of colors to a plurality of color difference images corresponding to the plurality of colors. The artificial neural network 110 may be provided as a program of software instructions executable by a processor of the demosaicing device 100.

The artificial neural network 110 may generate a plurality of output color difference images Icd1, Icd2 and Icd3 corresponding to the plurality of colors based on an input mosaic image Im including color pixel values corresponding to the plurality of colors. The plurality of output color difference images Icd1, Icd2 and Icd3 include a first output color difference image Icd1, a second output color difference image Icd2, and a third output color difference image Icd3. The artificial neural network 110 may simultaneously generate the plurality of output color difference images Icd1, Icd2 and Icd3 by performing a nonlinear operation on the color pixel values of the input mosaic image Im.

The adder circuit 120 may generate a plurality of demosaiced color images Id1, Id2 and Id3 corresponding to the plurality of colors by summing, pixel by pixel, the input mosaic image Im and each of the plurality of output color difference images Icd1, Icd2 and Icd3. The plurality of demosaiced color images Id1, Id2 and Id3 include a first demosaiced color image Id1, a second demosaiced color image Id2, and a third demosaiced color image Id3.

As will be described below with reference to FIG. 5 and FIG. 9, the adder circuit 120 may generate the color pixel values of the plurality of demosaiced color images Id1, Id2 and Id3 by summing, pixel by pixel, the color difference pixel values of each of the plurality of output color difference images Icd1, Icd2 and Icd3 and the color pixel values of the input mosaic image Im.

As such, the demosaicing method and the demosaicing device according to example embodiments may reduce image artifact and enhance image quality. Image quality may be enhanced by generating the color difference images using the artificial neural network having enhanced nonlinearity and by restoring the demosaiced color images simultaneously based on the color difference images.

Figure 3:
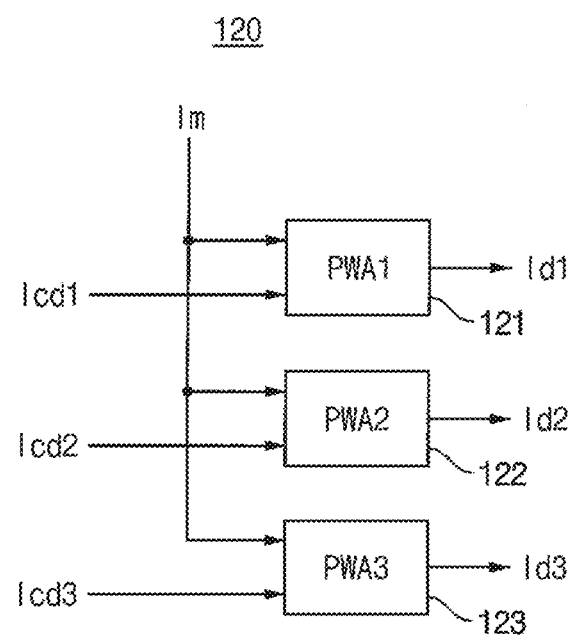
FIG. 3 is a diagram illustrating an example embodiment of an adder circuit included in the demosaicing device of FIG. 2.

FIG. 3 is a diagram illustrating an example embodiment of an adder circuit included in the demosaicing device of FIG. 2.

Referring to FIG. 3, an adder circuit 120 may include a first adder1 121 (PWA1), a second adder 122 (PWA2) and a third adder 123 (PWA3). FIG. 3 illustrates three color adders for convenience of illustration and description, and the number of color adders included in the adder circuit 120 may be determined variously depending on a color pattern of the input mosaic image Im to be demosaiced. The three color adders in FIG. 3 may correspond to a red color adder configured to generate red pixel values of a demosaiced red image, a green color adder configured to generate green pixel values of a demosaiced green image, and a blue color adder configured to generate blue pixel values of a demosaiced blue image.

The adder circuit 120 may receive, from the artificial neural network 110, the first output color difference image Icd1 for restoring the first demosaiced color image Id1, the second output color difference image Icd2 for restoring the second demosaiced color image Id2 and the third output color difference image Icd3 for restoring the third demosaiced color image Id3.

The first adder 121 may be the red color adder and may generate color pixel values of the first demosaiced color image Id1 by summing, pixel by pixel, color difference pixel values of the first output color difference image Icd1 and the color pixel values of the input mosaic image Im.

The second adder 122 may be the green color adder and may generate color pixel values of the second demosaiced color image Id2 by summing, pixel by pixel, color difference pixel values of the second output color difference image Icd2 and the color pixel values of the input mosaic image Im.

The third adder 123 may be the blue color adder and may generate color pixel values of the third demosaiced color image Id3 by summing, pixel by pixel, color difference pixel values of the third output color difference image Icd3 and the color pixel values of the input mosaic image Im.

FIG. 3 illustrates the adder circuit 120 that includes a plurality of color adders to perform pixel-wise additions in parallel, but example embodiments are not limited thereto. In some example embodiments, the adder circuit 120 may include a buffer and a single adder. The buffer may receive and buffer a plurality of color difference images that are provided simultaneously from the artificial neural network, and may sequentially output the plurality of color difference images such that the single adder may perform the pixel-wise addition sequentially with respect to the plurality of colors.

Hereinafter, example embodiments are described based on an input mosaic image representable by pixels with red pixel values R, green pixel values G and blue pixel values B, but example embodiments are not limited thereto. The number of pixels in an image and the color pattern of the input mosaic image are not limited to those illustrated in figures of this disclosure.

Figure 4:
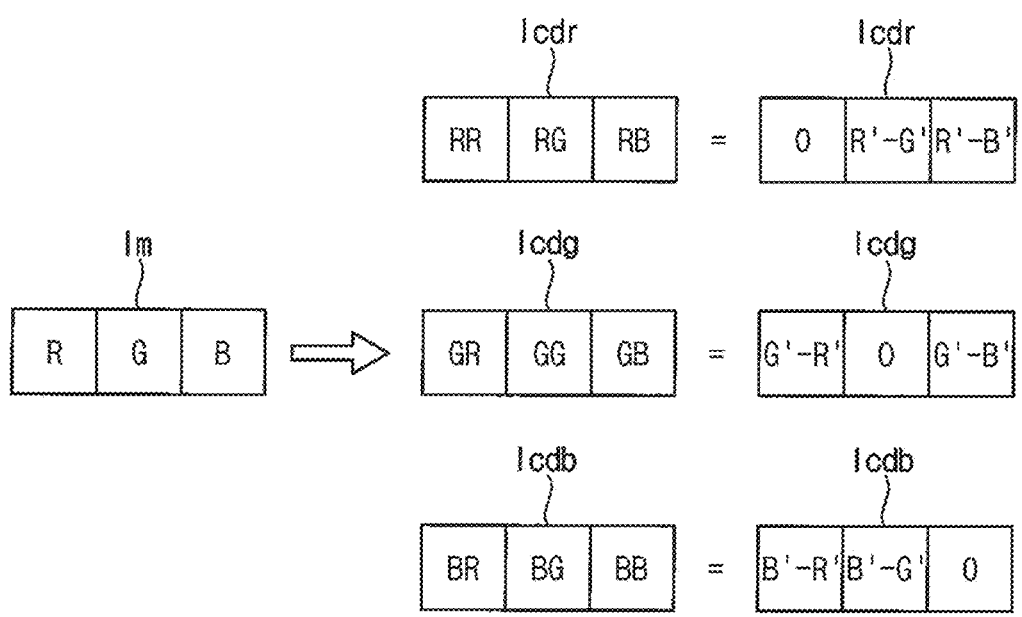
Figure 5:
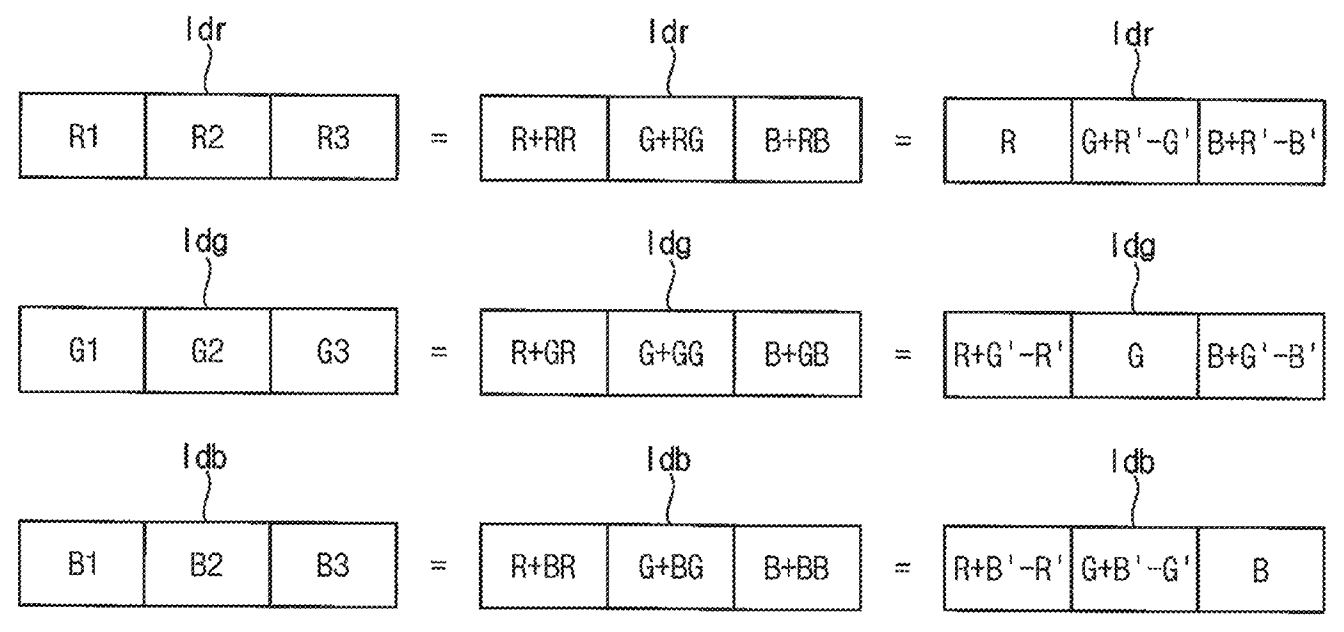

FIG. 4 and FIG. 5 are diagrams illustrating images in a demosaicing method based on deep learning according to example embodiments. For convenience of illustration, only three pixels corresponding to a red color R, a green color G and a blue color B are illustrated in FIG. 4 and FIG. 5.

As described above, the artificial neural network 110 in FIG. 2 may simultaneously generate color difference images Icdr, Icdg and Icdb. The color difference images Icdr, Icdg and Icdb include a red color difference image Icdr for restoring a demosaiced red image Idr, a green color difference image Icdg for restoring a demosaiced green image Idg and a blue color difference image Icdb for restoring a demosaiced blue image Idb.

Referring to FIG. 4, with respect to color difference pixel values RR, RG, and RB of the red color difference image Icdr, the color difference pixel value RR corresponding to a red pixel value R of the input mosaic image Im may have a value of zero. The color difference pixel value RG corresponding to a green pixel value G of the input mosaic image Im may have a value corresponding to a difference R'–G' between a red component R' and a green component G'. The color difference pixel value RB corresponding to a blue pixel value B of the input mosaic image Im may have a value corresponding to a difference R'–B' between a red component R' and a blue component B'.

With respect to color difference pixel values GR, GG and GB of the green color difference image Icdg, the color difference pixel value GR corresponding to a red pixel value R of the input mosaic image Im may have a value corresponding to a difference G'–R' between a green component G' and a red component R'. The color difference pixel value GG corresponding to a green pixel value G of the input mosaic image Im may have a value of zero. The color difference pixel value GB corresponding to a blue pixel value B of the input mosaic image Im may have a value corresponding to a difference G'–B' between a green component G' and a blue component B'.

With respect to color difference pixel values BR, BG and BB of the blue color difference image Icdb, the color difference pixel value BR corresponding to a red pixel value R of the input mosaic image Im may have a value corresponding to a difference B'–R' between a blue component B' and a red component R'. The color difference pixel value BG corresponding to a green pixel value G of the input mosaic image Im may have a value corresponding to a difference B'–G' between a blue component B' and a green component G'. The color difference pixel value BB corresponding to a blue pixel value B of the input mosaic image Im may have a value of zero.

As described above, the adder circuit 120 in FIG. 2 may generate the demosaiced red image Idr, the demosaiced green image Idg and the demosaiced blue image Idb by summing, pixel by pixel, each of the red color difference image Icdr, green color difference image Icdg and the blue color difference image Icdb and the input mosaic image Im. In other words, the adder circuit 120 may generate each color pixel value of the demosaiced color images Idr, Idg and Idb by summing each color difference pixel value of the color difference images Icdr, Icdg and Icdb and each color pixel value of the input mosaic image Im.

The red components R', the green components G' and the blue components B' in FIG. 4 may approach red pixel values, green pixel values and blue pixel values of a ground truth demosaiced image as performance of the artificial neural network is enhanced. In addition, the value of zero of the color difference pixel values RR, GG and BB are ideal values, but the values of the color difference pixel values RR, GG and BB do not necessarily have to be zero depending on the artificial neural network.

Referring to FIG. 5, with respect to the demosaiced red image Idr, the first red pixel value R1 corresponds to a sum R of the red pixel value R of the input mosaic image Im and the corresponding color difference pixel value RR=0 of the red color difference image Icdr. The second red pixel value R2 corresponds to a sum G+R'–G' of the green pixel value G of the input mosaic image Im and the corresponding color difference pixel value RG=R'–G' of the red color difference image Icdr. The third red pixel value R3 corresponds to a sum B+R'−B' of the blue pixel value B of the input mosaic image Im and the corresponding color difference pixel value RB=R'−B' of the red color difference image Icdr.

With respect to the demosaiced green image Idg, the first green pixel value G1 corresponds to a sum R+G'−R' of the red pixel value R of the input mosaic image Im and the corresponding color difference pixel value GR=G'−R' of the green color difference image Icdg. The second green pixel value G2 corresponds to a sum G of the green pixel value G of the input mosaic image Im and the corresponding color difference pixel value GG=0 of the green color difference image Icdg. The third green pixel value G3 corresponds to a sum B+G'−B' of the blue pixel value B of the input mosaic image Im and the corresponding color difference pixel value GB=G'−B' of the green color difference image Icdg.

With respect to the demosaiced blue image Idb, the first blue pixel value B1 corresponds to a sum R+B'−R' of the red pixel value R of the input mosaic image Im and the corresponding color difference pixel value BR=B'−R' of the blue color difference image Icdb. The second blue pixel value B2 corresponds to a sum G+B'−G' of the green pixel value G of the input mosaic image Im and the corresponding color difference pixel value BG=B'−G' of the blue color difference image Icdb. The third blue pixel value B3 corresponds to a sum B of the blue pixel value B of the input mosaic image Im and the corresponding color difference pixel value BB=0 of the blue color difference image Icdb.

As such, the adder circuit 120 may generate each color pixel value of the demosaiced color images Idr, Idg and Idb by performing the pixel-wise addition of the input mosaic image Im and each of the color difference images Icdr, Icdg and Icdb.

Figure 6:
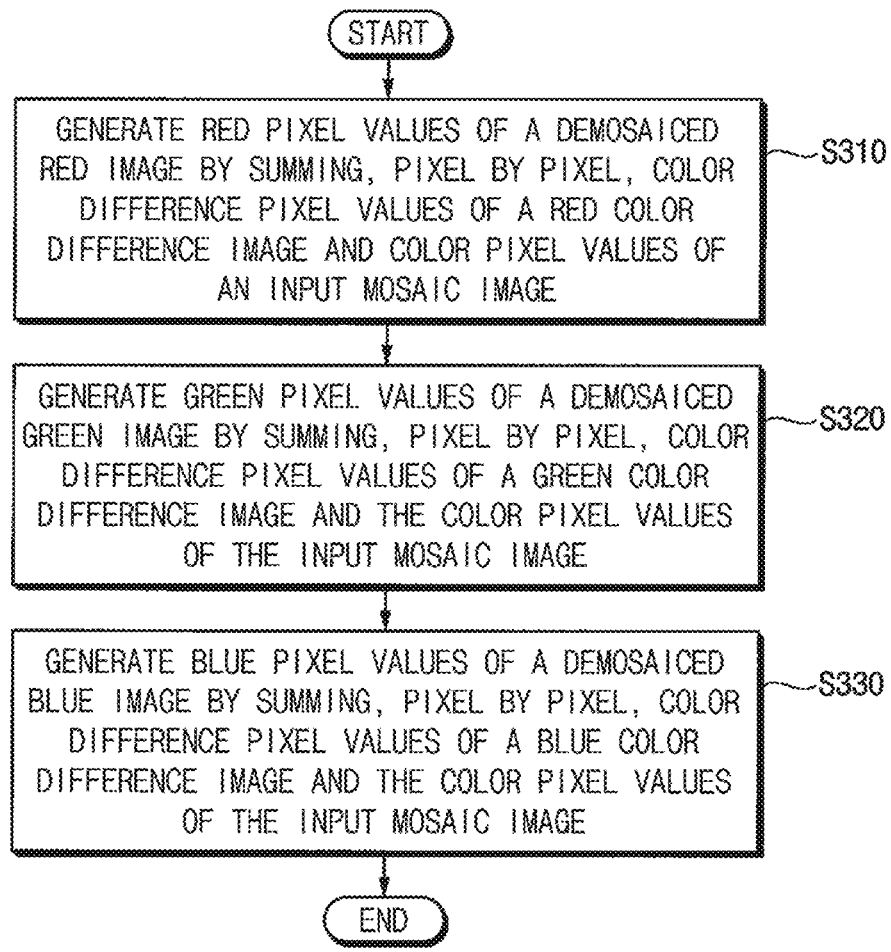
FIG. 6 is a flow chart illustrating an example embodiment of generating demosaiced color images in a demosaicing method based on deep learning according to example embodiments.

FIG. 6 is a flow chart illustrating an example embodiment of generating demosaiced color images in a demosaicing method based on deep learning according to example embodiments.

Referring to FIG. 5 and FIG. 6, the red pixel values R1, R2 and R3 of the demosaiced red image Idr may be generated by summing, pixel by pixel, the color difference pixel values RR, RG and RB of the red color difference image Icdr and the color pixel values R, G and B of the input mosaic image Im (S310).

The green pixel values G1, G2 and G3 of the demosaiced green image Idg may be generated by summing, pixel by pixel, the color difference pixel values GR, GG and GB of the green color difference image Icdg and the color pixel values R, G and B of the input mosaic image Im (S320).

The blue pixel values B1, B2 and B3 of the demosaiced blue image Idb may be generated by summing, pixel by pixel, the color difference pixel values BR, BG and BB of the blue color difference image Icdb and the color pixel values R, G and B of the input mosaic image Im (S330).

The processes S310, S320 and S330 are not necessarily performed in the order illustrated in FIG. 6. According to example embodiments, the processes S310, S320 and S330 may be sequentially performed in an order different from FIG. 6, or two or all three of the processes S310, S320 and S330 may be performed simultaneously.

In some example embodiments, the generation of the red pixel values R1, R2 and R3 (S310), the generation of the green pixel values G1, G2 and G3 (S320) and the generation of the blue pixel values B1, B2 and B3 (S330) may be performed simultaneously using the first adder 121, the second adder 122 and the third adder 123 as described with reference to FIG. 3. In some other example embodiments, the generation of the red pixel values R1, R2 and R3 (S310), the generation of the green pixel values G1, G2 and G3 (S320) and the generation of the blue pixel values B1, B2 and B3 (S330) may be performed sequentially using a buffer and a single adder.

Figure 7:
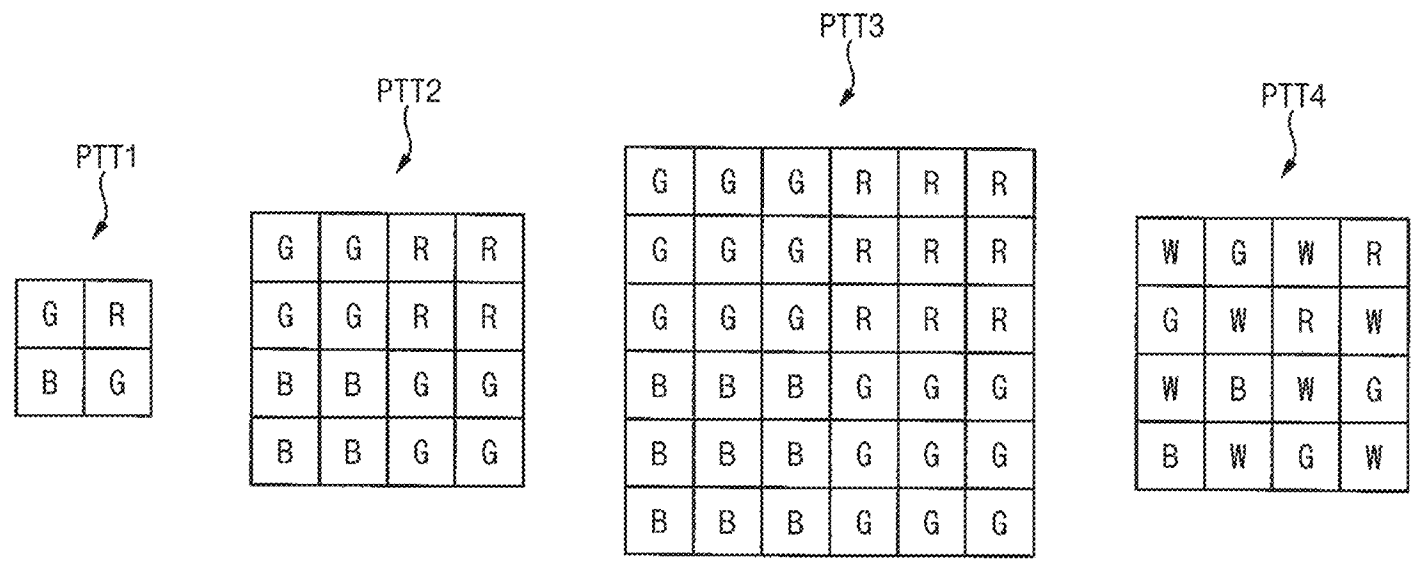

FIG. 7 is a diagram illustrating color patterns applicable to a demosaicing method based on deep learning according to example embodiments.

FIG. 7 illustrates, as examples, unit structures of a Bayer pattern PTT1, a Tetra pattern PTT2, a Nona pattern PTT3, and an RGBW pattern PTT4. Here, "a unit structure" indicates a minimum arrangement of pixels that cannot be divided in a smaller unit structure. It will be understood that example embodiments may be applied to any color patterns other than those illustrated in FIG. 7.

Referring to FIG. 7, the unit structure of the Bayer pattern PTT1 may include one red pixel R, two green pixels G and one blue pixel B. The unit structure of the Tetra pattern PTT2 may include four red pixels R, eight green pixels G and four blue pixels B. The unit structure of the Nona pattern PTT3 may include nine red pixels R, eighteen green pixels G and nine blue pixels B. The unit structure of the RGBW pattern PTT4 may include eight white pixels W, two red pixels R, four green pixels G and two blue pixels B.

Hereinafter, example embodiments are described based on the Bayer pattern PTT1 but example embodiments are not limited thereto. It will be understood that example embodiments may be applied to any color patterns.

Figure 8:
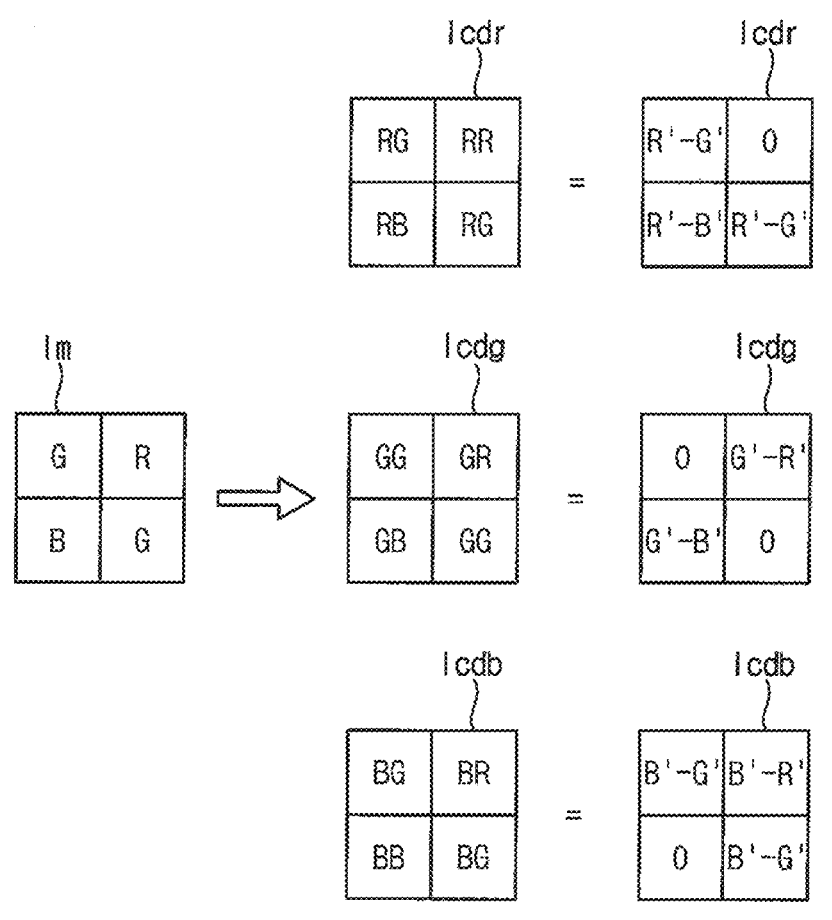

FIG. 8 and FIG. 9 are diagrams illustrating images in a demosaicing method based on deep learning according to example embodiments. For convenience of illustration, only four pixels of the unit structure of the Bayer pattern corresponding to a red color R, a green color G and a blue color B.

As described above, the artificial neural network 110 in FIG. 2 may simultaneously generate a red color difference image Icdr for restoring a demosaiced red image Idr, a green color difference image Icdg for restoring a demosaiced green image Idg and a blue color difference image Icdb for restoring a demosaiced blue image Idb.

Referring to FIG. 8, with respect to the red color difference image Icdr, the color difference pixel value RR corresponding to a red pixel value R of the input mosaic image Im may have a value of zero. The color difference pixel value RG corresponding to a green pixel value G of the input mosaic image Im may have a value corresponding to a difference R'−G' between a red component R' and a green component G'. The color difference pixel value RB corresponding to a blue pixel value B of the input mosaic image Im may have a value corresponding to a difference R'−B' between a red component R' and a blue component B'.

With respect to the green color difference image Icdg, the color difference pixel value GR corresponding to a red pixel value R of the input mosaic image Im may have a value corresponding to a difference G'−R' between a green component G' and a red component R'. The color difference pixel value GG corresponding to a green pixel value G of the input mosaic image Im may have a value of zero. The color difference pixel value GB corresponding to a blue pixel value B of the input mosaic image Im may have a value corresponding to a difference G'−B' between a green component G' and a blue component B'.

With respect to the blue color difference image Icdb, the color difference pixel value BR corresponding to a red pixel value R of the input mosaic image Im may have a value corresponding to a difference B'−R' between a blue component B' and a red component R'. The color difference pixel value BG corresponding to a green pixel value G of the input mosaic image Im may have a value corresponding to a difference B'−G' between a blue component B' and a green component G'. The color difference pixel value BB corresponding to a blue pixel value B of the input mosaic image Im may have a value of zero.

As described above, the adder circuit 120 in FIG. 2 may generate the demosaiced red image Idr, the demosaiced green image Idg and the demosaiced blue image Idb by summing, pixel by pixel, each of the red color difference image Icdr, green color difference image Icdg and the blue color difference image Icdb and the input mosaic image Im. In other words, the adder circuit 120 may generate each color pixel value of the demosaiced color images Idr, Idg and Idb by summing each color difference pixel value of the color difference images Icdr, Icdg and Icdb and each color pixel value of the input mosaic image Im.

Referring to FIG. 9, with respect to the demosaiced red image Idr, the first red pixel value R1 corresponds to a sum G+R'−G' of the green pixel value G of the input mosaic image Im and the corresponding color difference pixel value RG=R'−G' of the red color difference image Icdr. The second red pixel value R2 corresponds to a sum R of the red pixel value R of the input mosaic image Im and the corresponding color difference pixel value RR=0 of the red color difference image Icdr. The third red pixel value R3 corresponds to a sum B+R'−B' of the blue pixel value B of the input mosaic image Im and the corresponding color difference pixel value RB=R'−B' of the red color difference image Icdr. The fourth red pixel value R4 corresponds to a sum G+R'−G' of the green pixel value G of the input mosaic image Im and the corresponding color difference pixel value RG=R'−G' of the red color difference image Icdr.

With respect to the demosaiced green image Idg, the first green pixel value G1 corresponds to a sum G of the green pixel value G of the input mosaic image Im and the corresponding color difference pixel value GG=0 of the green color difference image Icdg. The second green pixel value G2 corresponds to a sum R+G'−R' of the red pixel value R of the input mosaic image Im and the corresponding color difference pixel value GR=G'−R' of the green color difference image Icdg. The third green pixel value G3 corresponds to a sum B+G'−B' of the blue pixel value B of the input mosaic image Im and the corresponding color difference pixel value GB=G'−B' of the green color difference image Icdg. The fourth green pixel value G4 corresponds to a sum G of the green pixel value G of the input mosaic image Im and the corresponding color difference pixel value GG=0 of the green color difference image Icdg.

With respect to the demosaiced blue image Idb, the first blue pixel value B1 corresponds to a sum G+B'−G' of the green pixel value G of the input mosaic image Im and the corresponding color difference pixel value BG=B'−G' of the blue color difference image Icdb.

The second blue pixel value B2 corresponds to a sum R+B'−R' of the red pixel value R of the input mosaic image Im and the corresponding color difference pixel value BR=B'−R' of the blue color difference image Icdb. The third blue pixel value B3 corresponds to a sum B of the blue pixel value B of the input mosaic image Im and the corresponding color difference pixel value BB=0 of the blue color difference image Icdb. The fourth blue pixel value B4 corresponds to a sum G+B'−G' of the green pixel value G of the input mosaic image Im and the corresponding color difference pixel value BG=B'−G' of the blue color difference image Icdb.

As such, the adder circuit 120 may generate each color pixel value of the demosaiced color images Idr, Idg and Idb by performing the pixel-wise addition of the input mosaic image Im and each of the color difference images Icdr, Icdg and Icdb.

Figure 10:
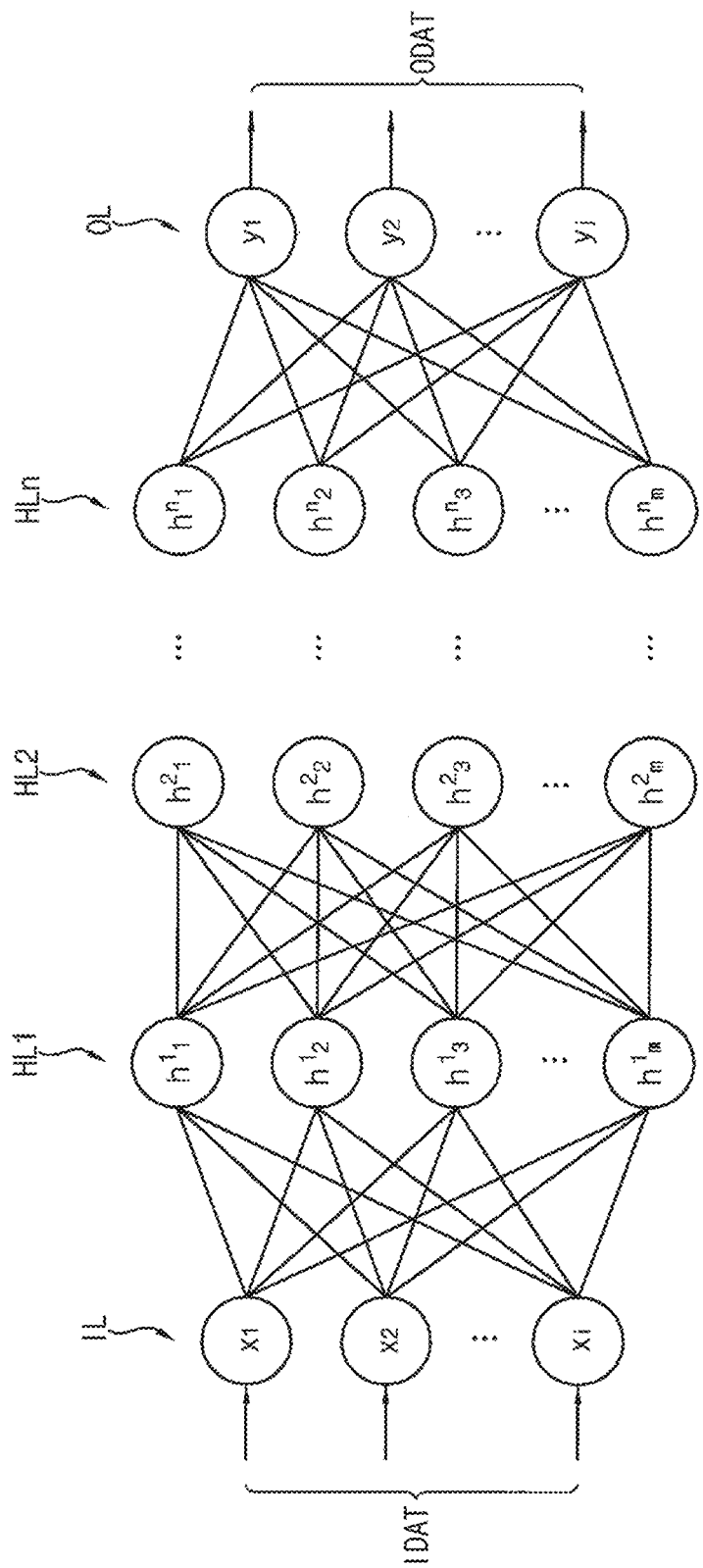
FIG. 10 and FIG. 11 are diagrams for describing examples of a deep learning neural network structure that is driven by a machine learning device according to example embodiments.
Figure 11:
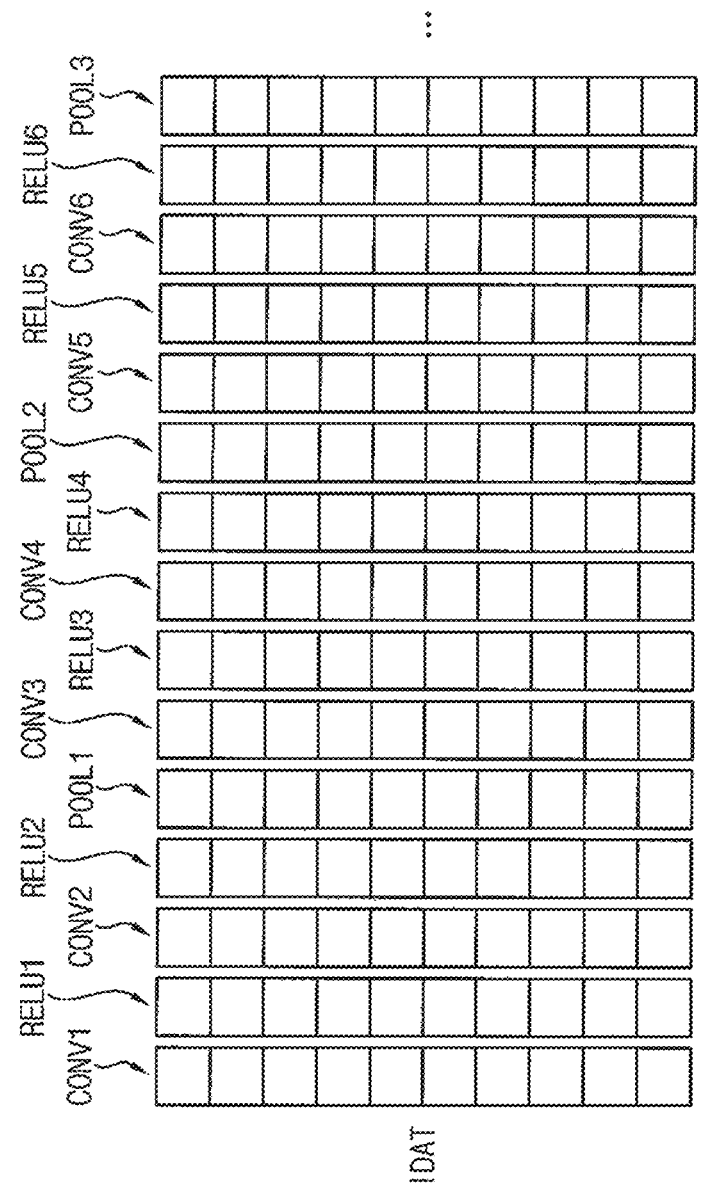

FIG. 10 and FIG. 11 are diagrams for describing examples of a deep learning neural network structure that is driven by a machine learning device according to example embodiments.

Referring to FIG. 10, a general neural network may include an input layer IL, a plurality of hidden layers HL1, HL2, . . . , HLn and an output layer OL.

The input layer IL may include i input nodes x1, x2, . . . , xi, where i is a natural number. Input data (e.g., vector input data) IDAT with a length i may be input to the input nodes x1, x2, . . . , xi such that each element of the input data IDAT is input to a respective one of the input nodes x1, x2, . . . , xi.

The plurality of hidden layers HL1, HL2, . . . , HLn may include n hidden layers, where n is a natural number, and may include a plurality of hidden nodes $h^1_1$, $h^1_2$, $h^1_3$, $h^1_m$, $h^2_1$, $h^2_2$, $h^1_1$, $h^1_2$, $h^1_3$, $h^1_m$, $h''_1$, $h''_2$, $h''_3$, . . . , $h''_m$. For example, the hidden layer HL1 may include m hidden nodes $h^1_1$, $h^1_2$, $h^1_3$, . . . , $h^1_m$, the hidden layer HL2 may include m hidden nodes $h^2_1$, $h^2_2$, $h^2_3$, . . . , $h^2_m$, and the hidden layer HLn may include m hidden nodes $h''_1$, $h''_2$, $h''_3$, . . . , $h''_m$, where m is a natural number. The number of hidden nodes may be determined variously per hidden layer.

The output layer OL may include j output nodes $y_1$, $y_2$, . . . , $y_j$ to generate output data ODAT corresponding to the input data IDAT where j is a natural number.

A structure of the neural network illustrated in FIG. 10 may be represented by information on branches (or connections) between nodes illustrated as lines, and a weighted value assigned to each branch. Nodes within one layer may not be connected to one another, but nodes of different layers may be fully or partially connected to one another.

Each node (e.g., the node $h^1_1$) may receive an output of a previous node (e.g., the node $x_1$), may perform a computing operation, computation or calculation on the received output, and may output a result of the computing operation, computation or calculation as an output to a next node (e.g., the node $h^2_1$). Each node may calculate a value to be output by applying the input to a specific function, e.g., a nonlinear function.

Generally, the structure of the neural network may be set in advance, and the weighted values for the connections between the nodes are set appropriately using data having an already known answer of which class the data belongs to. The data with the already known answer is referred to as "training data," and a process of determining the weighted value is referred to as "training." The neural network "learns" during the training process. A group of an independently trainable structure and the weighted value is referred to as a "model," and a process of predicting, by the model with the determined weighted value, which class the input data belongs to, and then outputting the predicted value, is referred to as a "testing" process.

The general neural network illustrated in FIG. 10 may not be suitable for handling input image data (or input sound data) because each node (e.g., the node $h^1_1$) is connected to all nodes of a previous layer (e.g., the nodes $x_1$, $x_2$, . . . , $x_i$ included in the layer IL) and then the number of weighted values drastically increases as the size of the input image data increases. Thus, a convolutional neural network (CNN), which is implemented by combining the filtering technique with the general neural network, has been researched such that two-dimensional image data (e.g., the input image data) is efficiently trained by the convolutional neural network.

Referring to FIG. 11, a convolutional neural network may include a plurality of layers CONV1, RELU1, CONV2, RELU2, POOL1, CONV3, RELU3, CONV4, RELU4, POOL2, CONV5, RELU5, CONV6, RELU6, POOL3, and so on.

Unlike the general neural network, each layer of the convolutional neural network may have three dimensions of width, height, and depth, and thus data that is input to each layer may be volume data having three dimensions of width, height, and depth. For example, if an input image in FIG. 11 has a size of 32 width units (e.g., 32 pixels) and 32 height units (e.g., 32 pixels) and three color channels R, G and B, input data IDAT corresponding to the input image may have a size of 32×32×3. The input data IDAT may be referred to as input volume data or input activation volume.

Each of convolutional layers CONV1, CONV2, CONV3, CONV4, CONV5 and CONV6 may perform a convolutional operation on input volume data. In image processing, the convolutional operation represents an operation in which image data is processed based on a mask with weighted values and an output value is obtained by multiplying input values by the weighted values and adding up the total multiplied values. The mask may be referred to as a filter, window, or kernel.

In further detail, parameters of each convolutional layer may consist of or include a set of learnable filters. Every filter may be spatially small (along width and height), but may extend through the full depth of an input volume. For example, during the forward pass, each filter may be slid (more precisely, convolved) across the width and height of the input volume, and dot products may be computed between the entries of the filter and the input at any position. As the filter is slid over the width and height of the input volume, a two-dimensional activation map that gives the responses of that filter at every spatial position may be generated. As a result, an output volume may be generated by stacking these activation maps along the depth dimension. For example, if input volume data having a size of 32×32×3 passes through the convolutional layer CONV1 having twelve filters with zero-padding, output volume data of the convolutional layer CONV1 may have a size of 32×32×12 (e.g., a depth of volume data increases).

Each of RELU layers RELU1, RELU2, RELU3, RELU4, RELU5 and RELU6 may perform a rectified linear unit operation that corresponds to an activation function defined by, e.g., a function $f(x)=\max(0, x)$ (e.g., an output is zero for all negative input x). For example, if input volume data having a size of 32×32×12 passes through the RELU layer RELU1 to perform the rectified linear unit operation, output volume data of the RELU layer RELU1 may have a size of 32×32×12 (e.g., a size of volume data is maintained).

Each of pooling layers POOL1, POOL2 and POOL3 may perform a down-sampling operation on input volume data along spatial dimensions of width and height. For example, four input values arranged in a 2×2 matrix formation may be converted into one output value based on a 2×2 filter. For example, a maximum value of four input values arranged in a 2×2 matrix formation may be selected based on 2×2 maximum pooling, or an average value of four input values arranged in a 2×2 matrix formation may be obtained based on 2×2 average pooling. For example, if input volume data having a size of 32×32×12 passes through the pooling layer POOL1 having a 2×2 filter, output volume data of the pooling layer POOL1 may have a size of 16×16×12 (e.g., width and height of volume data decreases, and a depth of volume data is maintained).

Typically, one convolutional layer (e.g., CONV1) and one RELU layer (e.g., RELU1) may form a pair of CONV/RELU layers in the convolutional neural network. Pairs of the CONV/RELU layers may be repeatedly arranged in the convolutional neural network. The pooling layer may be periodically inserted in the convolutional neural network. As a result an image spatial size may be reduced and an image characteristic may be extracted.

It is understood that the types and number of layers included in the convolutional neural network are not necessarily limited to the example described above with reference to FIG. 11 and may be changed or vary according to one or more other exemplary embodiments. In addition, it is understood that the convolutional neural network may further include other layers such as a softmax layer for converting score values corresponding to predicted results into probability values, a bias adding layer for adding at least one bias, or the like.

Figure 12:
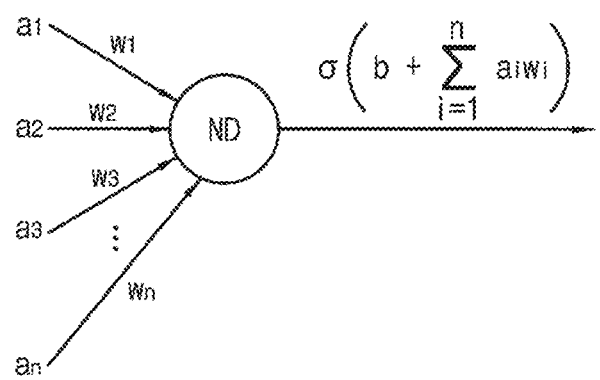
FIG. 12 is a diagram illustrating an example of a node included in a neural network

FIG. 12 is a diagram illustrating an example of a node included in a neural network FIG. 12 illustrates an example node operation performed by a node ND in a neural network. When N inputs a1~an are provided to the node ND, the node ND may multiply the n inputs a1~an and corresponding n weights w1~wn, respectively, may sum n values obtained by the multiplication, may add an offset "b" to a summed value, and may generate one output value by applying a value to which the offset "b" is added to a specific function "σ". The learning operation may be performed based on the training data to update all nodes in the neural network.

Figure 13:
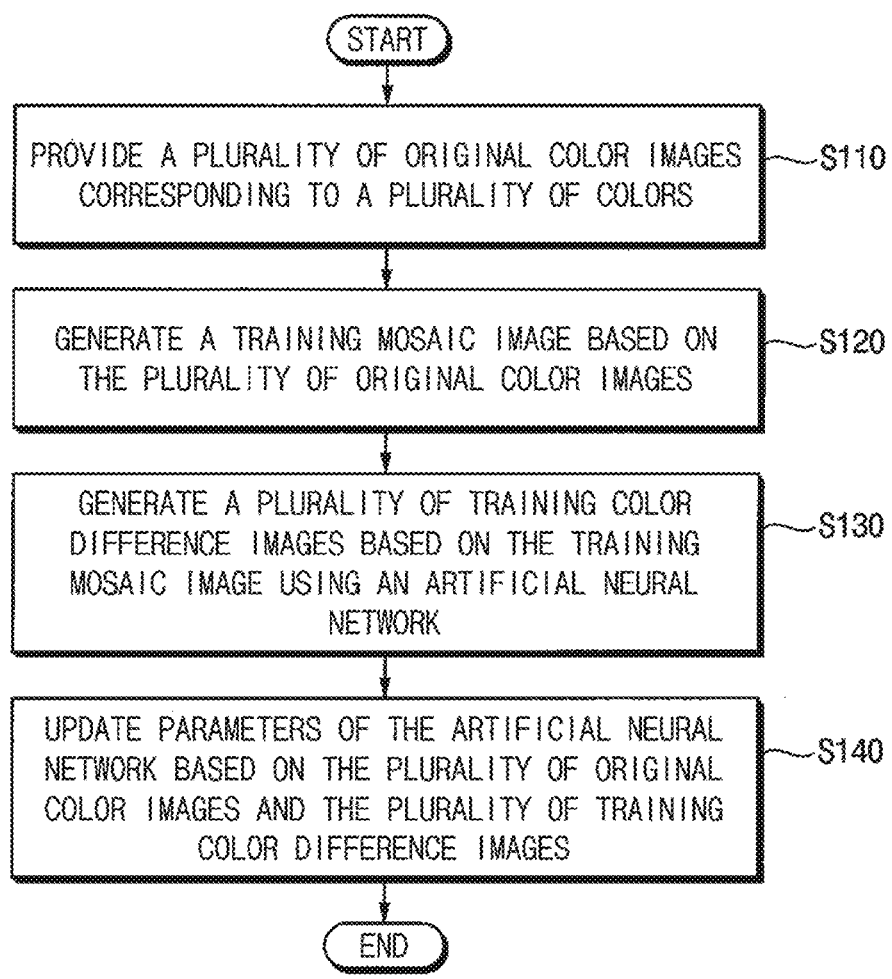
FIG. 13 is a flow chart illustrating an example embodiment of training an artificial neural network in a demosaicing method based on deep learning according to example embodiments.
Figure 14:
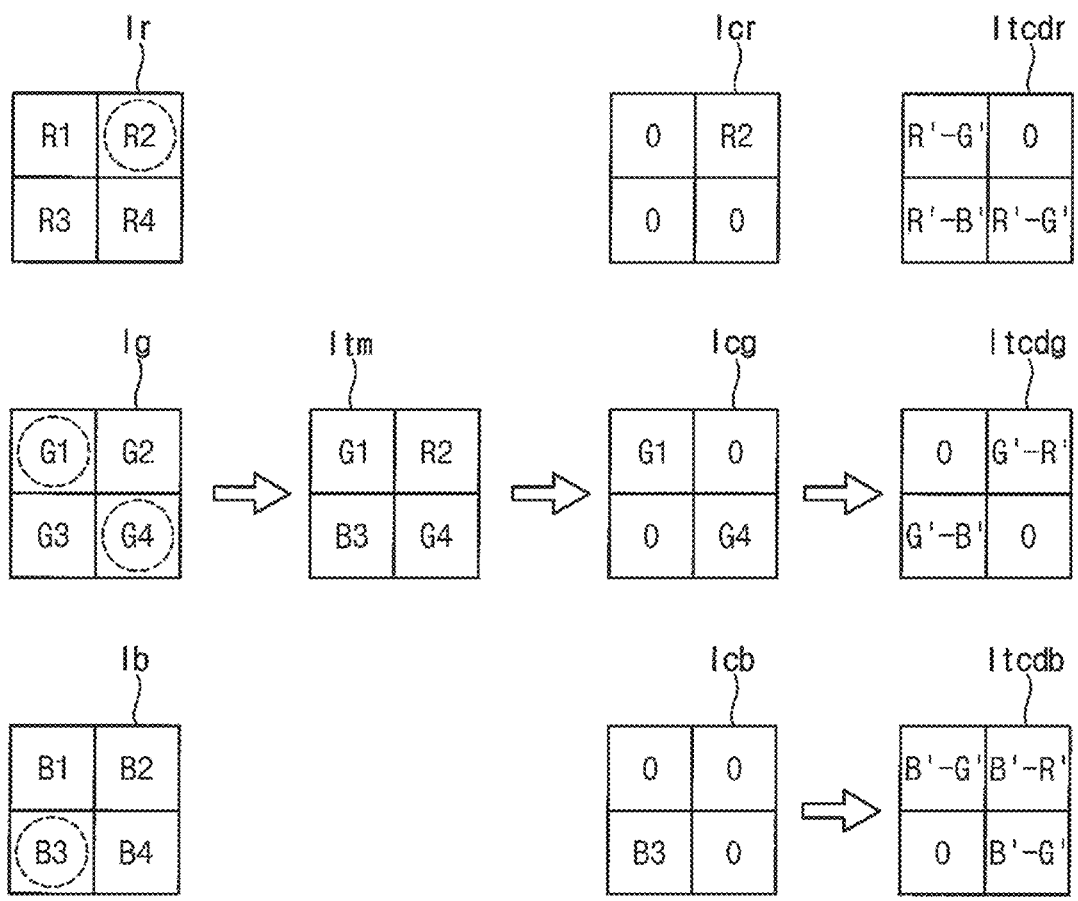
FIG. 14 is a diagram illustrating images in training the artificial neural network of FIG. 13.

FIG. 13 is a flow chart illustrating an example embodiment of training an artificial neural network in a demosaicing method based on deep learning according to example embodiments. FIG. 14 is a diagram illustrating images in training the artificial neural network of FIG. 13. For convenience of illustration and description, only pixels corresponding to one unit structure of the Bayer pattern are shown in FIG. 14.

Referring to FIG. 13 and FIG. 14, a plurality of original color images corresponding to the plurality of colors may be provided (S110).

For example, the plurality of original color images may include an original red image Ir, an original green image Ig and an original blue image Ib. As illustrated in FIG. 14, the original red image Ir, the original green image Ig and the original blue image Ib may be full color images or demosaiced images. In other words, the original red image Ir may include four red pixel values R1~R4 corresponding to four pixels, the original green image Ig may include four green pixel values G1~G4 corresponding to the four pixels, and the original blue image Ib may include four blue pixel values B1~B4 corresponding to the four pixels. In general, each of the original red image Ir, the original green image Ig and the original blue image Ib may include n*m pixels (n, m are positive integers) and each pixel in one image one-to-one corresponds to each pixel in another image by the same pixel position.

The training mosaic image may be generated based on the plurality of original color images (S120).

As illustrated in FIG. 14, each pixel value of the training mosaic image Itm may be determined by extracting each pixel value from one of the original red image Ir, the original green image Ig and the original blue image Ib based on the same pixel position. For example, the second red pixel value R2 of the original red image Ir, the first green pixel value G1 and the fourth green pixel value G4 of the original green image Ig, and the third blue pixel value B3 of the original blue image Ib may be extracted as the color pixel values of the training mosaic image Itm.

The plurality of training color difference images may be generated based on the training mosaic image using the artificial neural network (S130).

In some example embodiments, as illustrated in FIG. 14, a red channel image Icr, a green channel image Icg and a blue channel image Icb including only the corresponding color pixel values may be generated based on the training mosaic image Itm. The red channel image Icr, the green channel image Icg, and the blue channel image Icb may be provided as input of an artificial neural network to generate a training red color difference image Itcdr, a training green color difference image Itcdg, and a training blue color difference image Itcdb.

The color difference pixel values of the training red color difference image Itcdr, the training green color difference image Itcdg, and the training blue color difference image Itcdb may correspond to differences of the red component R', the green component G' and the blue component B' as described with reference to FIG. 8.

Parameters of the artificial neural network may be updated based on the plurality of original color images and the plurality of training color difference images (S140). The updating of the parameters will be described with reference to FIG. 15 and FIG. 16.

FIG. 13 illustrates the training process using one original image set of the plurality of original color images. In general, training of the artificial neural network as illustrated in FIG. 13 is performed repeatedly based on a huge number of original image sets. The performance or the accuracy of the finally trained artificial neural network may depend on the number of the original image sets used in training, the complexity of the artificial neural network, etc.

Figure 15:
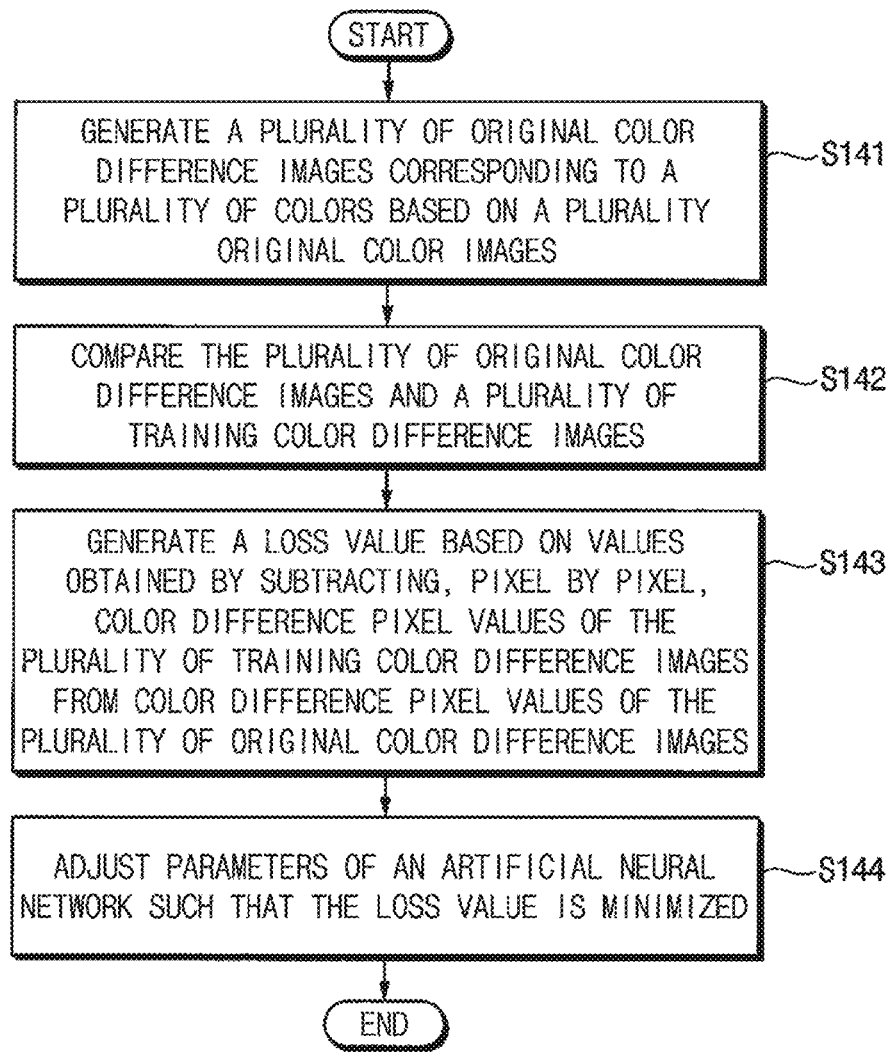
FIG. 15 is a flow chart illustrating an example embodiment of updating parameters of an artificial neural network in a demosaicing method based on deep learning according to example embodiments.
Figure 16:
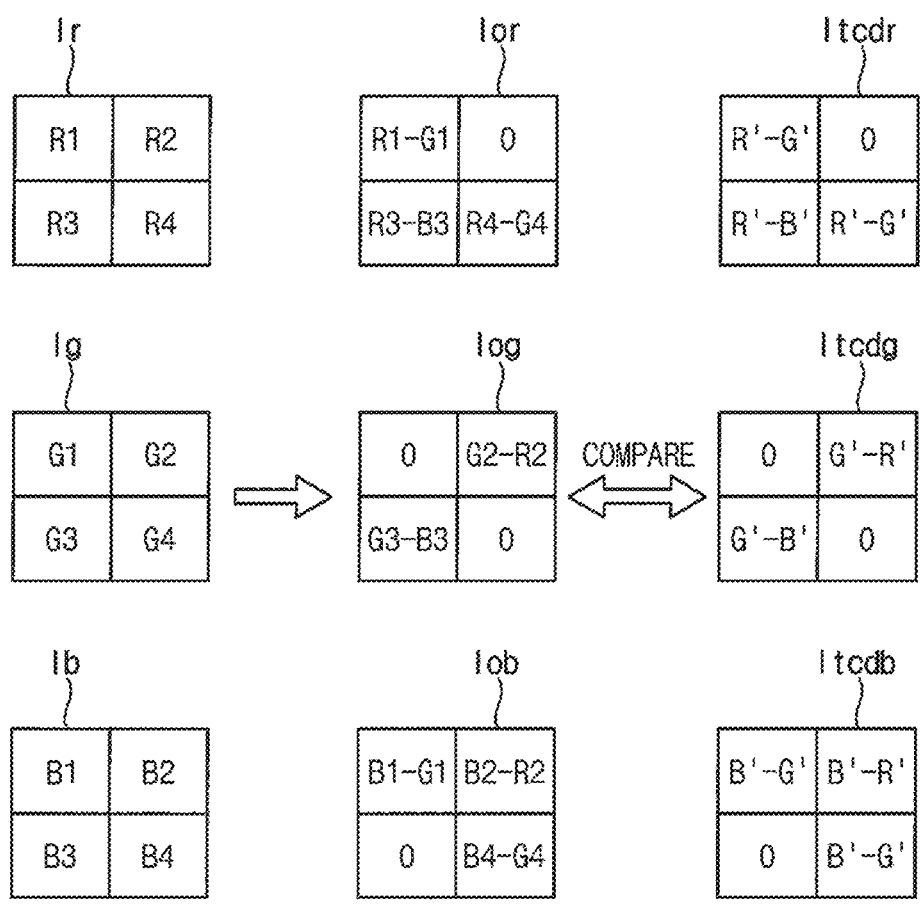
FIG. 16 is a diagram for describing the parameter updating of FIG. 15.

FIG. 15 is a flow chart illustrating an example embodiment of updating parameters of an artificial neural network in a demosaicing method based on deep learning according to example embodiments. FIG. 16 is a diagram for describing the parameter updating of FIG. 15.

Referring to FIG. 15 and FIG. 16, a plurality of original color difference images corresponding to the plurality of colors may be generated based on the plurality original color images (S141). Here the plurality of original color images may be demosaiced images corresponding to a plurality of colors which are open in public. Ground truth images for supervised learning of an artificial neural network may be generated using the plurality of original color images.

As illustrated in FIG. 16, an original red color difference image Ior, an original green color difference image Iog and an original blue color difference image Iob may be generated by calculating differences between the pixel values of the original red image Ir, the original green image Ig and the original blue image Ib.

The color difference pixel values of the original red color difference image Ior may be obtained by subtracting the color pixel values G1, R2, B3 and G4 of the training mosaic image Itm in FIG. 14 from the red pixel values R1, R2, R3 and R4 of the original red image Ir, respectively.

The color difference pixel values of the original green color difference image Iob may be obtained by subtracting the color pixel values G1, R2, B3 and G4 of the training mosaic image Itm in FIG. 14 from the green pixel values G1, G2, G3 and G4 of the original green image Ig, respectively.

The color difference pixel values of the original blue color difference image Iob may be obtained by subtracting the color pixel values G1, R2, B3 and G4 of the training mosaic image Itm in FIG. 14 from the blue pixel values B1, B2, B3 and B4 of the original green image Ig, respectively.

The plurality of original color difference images and the plurality of training color difference images may be compared (S142).

FIG. 16 illustrates the training red color difference image Itcdr, the training green color difference image Itcdg and the training blue color difference image Itcdb that are generated from the artificial neural network. The training red color difference image Itcdr may be compared with the original red color difference image Ior. The training green color difference image Itcdg may be compared with the original green color difference image Iog. The training blue color difference image Itcdb may be compared with the original blue color difference image Iob.

The original red color difference image Ior, the original green color difference image Iog and the original blue color difference image Iob, which are generated using the plurality of original color images Ir, Ig and Ib, correspond to ground truth images. The learning degree of the artificial neural network may be estimated through the supervised learning by comparing the training color difference images Itcdr, Itcdg and Itcdb, which are generated from the artificial neural network, with the ground truth images Ior, Iog and Iob.

The parameters of the artificial neural network may be updated based on a result of the comparing.

In some example embodiments, a loss value may be generated based on values obtained by subtracting, pixel by pixel, the color difference pixel values of the plurality of training color difference images Itcdr, Itcdg and Itcdb from the color difference pixel values of the plurality of original color difference images Ior, Iog and Iob (S143). The parameters of the artificial neural network may be adjusted such that the loss value may be minimized (S144).

A loss function for generating the loss value may be determined properly for quantification of the error or the difference between the ground truth and the output of the artificial neural network. For example, the loss function may include the L1 loss function, the L2 loss function, the peak signal to noise ratio (PSNR) function, the structural similarity (SSIM) function, etc., which are well known to those skilled in the art.

The trained artificial neural network may be provided by repeatedly performing the processes of FIG. 13 and FIG. 15 and gradually updating the parameters such as weight values of the artificial neural network in the direction to reduce the loss value, until a learning completion condition is satisfied, for example, until the loss value is decreased to be smaller than a predetermined reference value.

Hereinafter, an artificial neural network having an encoder-decoder structure is described with reference to FIG. 17. It will be understood that example embodiments are not limited to the encoder-decoder structure. The artificial neural network for the demosaicing method according to example embodiments may have various structures.

Figure 17:
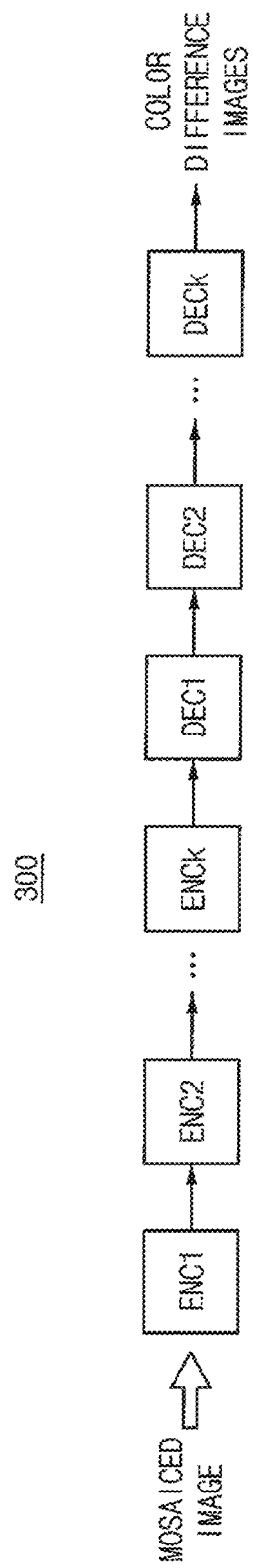
FIG. 17 is a block diagram illustrating a structure of an artificial neural network for a demosaicing method based on deep learning according to example embodiments.

FIG. 17 is a block diagram illustrating a structure of an artificial neural network for a demosaicing method based on deep learning according to example embodiments.

Referring to FIG. 17, an artificial neural network for a demosaicing method according to example embodiments may be implemented as a convolutional neural network (CNN) having an encoder-decoder structure.

A CNN or an artificial neural network 300 may include a plurality of encoders ENC1~ENCk and a plurality of decoders DEC1~DECk, which are cascade-connected. The artificial neural network 300 may be trained or learned to generate color difference images based on mosaic images or mosaiced images. The artificial neural network 300 may be trained to simultaneously generate a plurality of color difference images (e.g., a red color difference image, a green color difference image and a blue color difference image) by performing a nonlinear operation on color pixel values (e.g., red pixel values, green pixel values and blue pixel values) of the input mosaic image. In other words, the output layer of the artificial neural network 300 may include a plurality of channels to output a plurality of color channel images.

In some example embodiments, as illustrated in FIG. 17, the artificial neural network 300 may include three encoders ENC1, ENC2 and ENC3 configured to sequentially perform down-sampling based on an input mosaic image and three decoders DEC1, DEC2 and DEC3 configured to sequentially perform up-sampling.

The encoders ENC1, ENC2 and ENC3 may include at least one convolution layer CONV having a predetermined kernel size (e.g., 3×3 size) and stride sizes. The decoders DEC1, DEC2 and DEC3 may include a de-convolution layer and a convolution layer. At least one of the encoders ENC1, ENC2 and ENC3 and the decoders DEC1, DEC2 and DEC3 may include a summing layer to perform an elementary-wise sum. The de-convolution layer and the convolution layer may include a rectified linear layer.

The encoders ENC1, ENC2 and ENC3 may sequentially perform down-sampling and training of residual components based on the input mosaic image or the training mosaic image to generate encoded image maps. The decoders DEC1, DEC2 and DEC3 may sequentially perform up-sampling and restoring of resolution based on the encoded image maps to generate the color difference images as described above.

The artificial neural network 300 is based on deep learning to restore RGB color difference images from an RGB mosaic image. In the RGB pattern of the input image, the pixel values are split per red, green, and blue to generate different color channel signals that are input to the artificial neural network 300. The residual components may be trained through the encoders and the resolution may be restored through the decoders. The high-frequency components of the input signal may be reserved through skip-connection. As such, the artificial neural network 300 may generate the three-channel color difference images that are restored finally.

Demosaicing is digital image processing to generate full color images (e.g., demosaiced images) from an imperfect color image (e.g., a mosaic image or a CFA image). The full color image may be obtained using a plurality of image sensors corresponding to different colors, but such schemes increase costs and require spectral band pass filter having a form of a beam splitter.

As the more efficient method, one color component per each pixel may be obtained using an image sensor including a color filter array (CFA) and missing color components may be obtained through interpolation methods.

As described above, the demosaicing method and the demosaicing device according to example embodiments may reduce image artifact and enhance image quality. Image quality may be enhanced by generating the color difference images using the artificial neural network having enhanced nonlinearity and by restoring the demosaiced color images simultaneously based on the color difference images.

Figure 19:
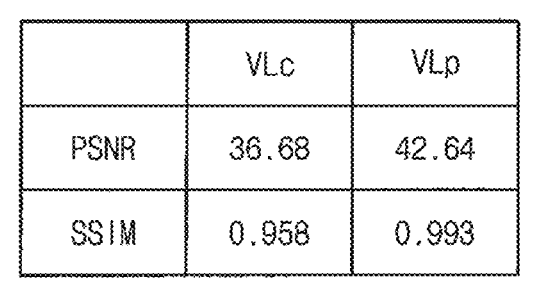

FIG. 18 and FIG. 19 are diagrams illustrating effects of a demosaicing method based on deep learning according to example embodiments.

FIG. 18 illustrates demosaiced images IMGc generated by a conventional interpolating method and demosaiced images IMGp generated by a demosaicing method according to example embodiments.

FIG. 19 illustrates estimated values VLc corresponding to the demosaiced image generated by the conventional interpolating method and estimated values VLp corresponding to the demosaiced image generated by the demosaicing method according to example embodiments, through two estimating methods of PSNR and SSIM.

As shown in FIG. 18 and FIG. 19, in comparison with the conventional interpolating method, the image artifact may be reduced and the image quality may be enhanced through the demosaicing method according to example embodiments.

Figure 20:
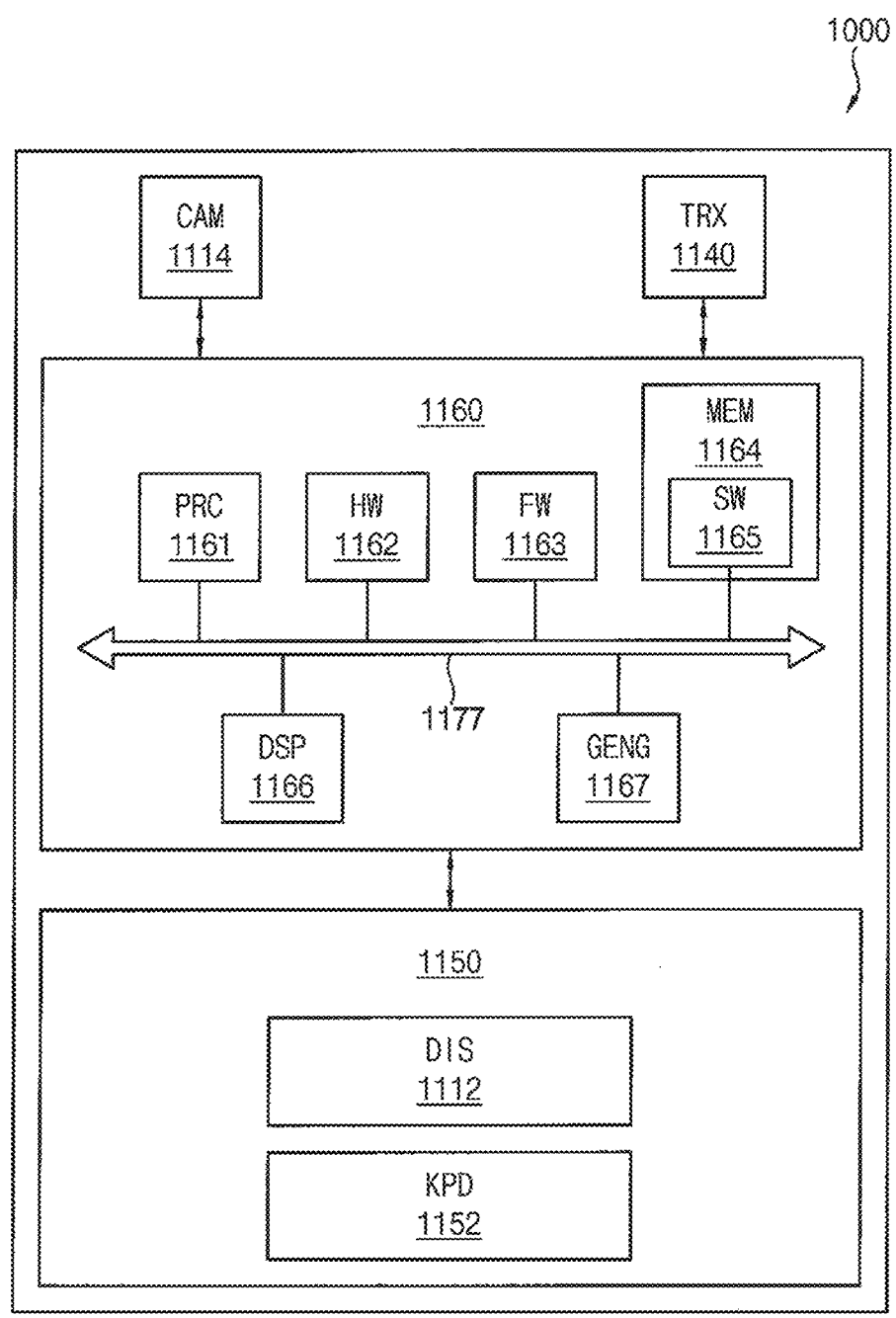
FIG. 20 is a block diagram illustrating a system performing a demosaicing method based on deep learning according to example embodiments.

FIG. 20 is a block diagram illustrating a system performing a demosaicing method based on deep learning according to example embodiments.

Referring to FIG. 20, a system 1000 may include camera module 1114 (CAM), a transceiver 1140 (TRX), a control unit 1160 and a user interface 1150.

The camera module 1114 may include a camera and/or an image sensor to capture and provide images. In some example embodiments, the camera module 1114 may include a plurality of cameras to capture a plurality of input images to be merged. In some example embodiments, the camera module 1114 may provide a plurality of input images to be merged where the plurality of input images are captured by a single camera.

The transceiver 1140 may provide connectivity through wired or wireless links to other networks such as an internet, a cellular network, etc.

The user interface 1150 may include input devices 1152 (KPD) such as a keyboard, a keypad, etc. and a display device 1112 (DSP) to display images. In some examples, a virtual keypad or keyboard may be integrated into the display device 1112 with a touch screen/sensor or the like.

The control unit 1116 may include a general purpose processor 1161 (PRC), a hardware device 1162 (HW), a firmware device 1163 (FW), a memory 1164 (MEM), a digital signal processor 1166 (DSP), a graphics engine 1167 (GENG), and a bus 1177. The memory 1164 may store the trained artificial neural network 110 described herein, and the general purpose processor 1161 and/or the digital signal processor 1166 may execute the trained artificial neural network 110 described herein. The control unit 1160 may perform the demosaicing method based on deep learning according to example embodiments. In other words, the control unit 1160 may be configured to perform functions of the demosaicing device as described above.

Example embodiments may be implemented as hardware, software, a firmware, or a combination thereof.

In some example embodiments, the demosaicing method based on deep learning according to example embodiments may be performed by the digital signal processor 1166. For example, the demosaicing device as described may include or may be included in the digital signal processor 1166.

In some example embodiments, at least a portion of the methods according to example embodiments may be performed by program instructions that are executed by a processing device. The program instructions may be stored in the memory 1164 as software 1165 (SW), and the program instructions may be executed by the general purpose processor 1161 and/or the digital signal processor 1166.

In some example embodiments, to execute the program instructions, the general purpose processor 1161 may retrieve or fetch the program instructions from an internal register, an internal cache, or the memory 1164 and decode and execute the instructions. During or after execution of the program instructions, the general purpose processor 1161 may write one or more results (which may be intermediate or final results) of the program instructions to the internal register, internal cache, or the memory 1164.

The system 1000 may be a computer system taking any suitable physical form. For example, the system 1000 may be an embedded computer system, a system-on-chip (SOC), a single-board computer system (SBC) such as a computer-on-module (COM) or system-on-module (SOM), a desktop computer system, a laptop or notebook computer system, an interactive kiosk, a mainframe, a mesh of computer systems, a mobile telephone, a personal digital assistant (PDA), a server, a tablet computer system, or a combination of two or more of these.

The program instruction for implementing methods according to example embodiments may be stored in a computer-readable non-transitory storage medium or media.

The computer-readable non-transitory storage medium may include one or more semiconductor-based or other integrated circuits (ICs) such as field-programmable gate arrays (FPGAs) or application-specific ICs (ASICs), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Figure 21:
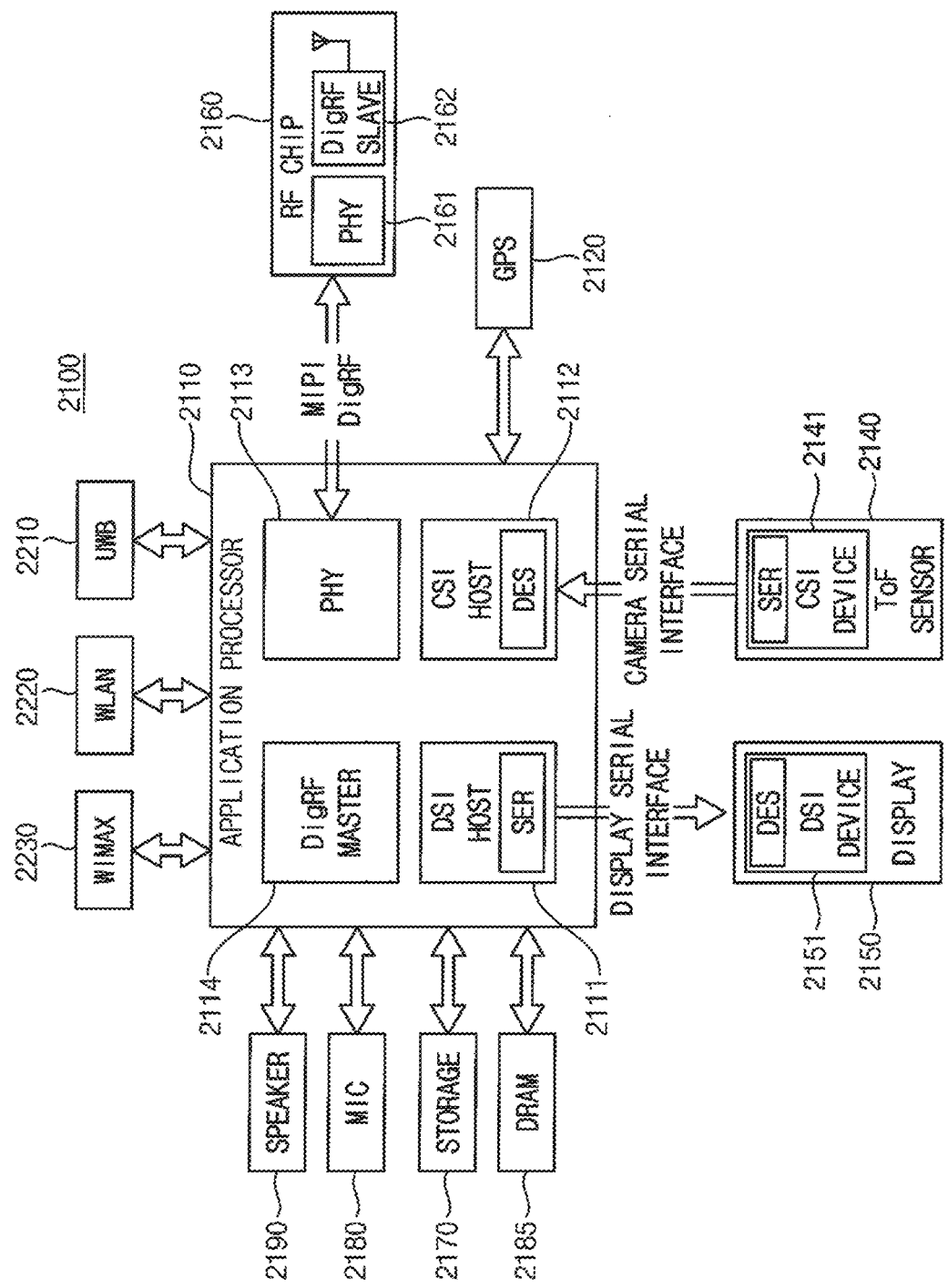
FIG. 21 is a block diagram illustrating an example embodiment of an interface employable in the system of FIG. 20 according to example embodiments.

FIG. 21 is a block diagram illustrating an example embodiment of an interface employable in the system of FIG. 20 according to example embodiments.

Referring to FIG. 21, a computing system 2100 may be implemented by a data processing device that uses or supports a mobile industry processor interface (MIPI) interface. The computing system 2100 may include an application processor 2110, a three-dimensional image sensor 2140 such as a time-of-flight (ToF) sensor, a display device 2150, etc. A CSI host 2112 of the application processor 2110 may perform a serial communication with a CSI device 2141 of the three-dimensional image sensor 2140 via a camera serial interface (CSI). In some example embodiments, the CSI host 2112 may include a deserializer (DES), and the CSI device 2141 may include a serializer (SER). A DSI host 2111 of the application processor 2110 may perform a serial communication with a DSI device 2151 of the display device 2150 via a display serial interface (DSI).

In some example embodiments, the DSI host 2111 may include a serializer (SER), and the DSI device 2151 may include a deserializer (DES). The computing system 2100 may further include a radio frequency chip 2160 (RF chip) performing a communication with the application processor 2110. A physical layer (PHY) 2113 of the computing system 2100 and a physical layer 2161 (PHY) of the radio frequency chip 2160 may perform data communications based on a MIPI DigRF. The application processor 2110 may further include a DigRF MASTER 2114 that controls the data communications of the physical layer 2161.

The computing system 2100 may further include a global positioning system 2120 (GPS), a storage 2170, a MIC 2180, a DRAM device 2185, and a speaker 2190. In addition, the computing system 2100 may perform communications using an ultra-wideband 2210 (UWB), a wireless local area network 2220 (WLAN), a worldwide interoperability for microwave access 2130 (WIMAX), etc. However, the structure and the interface of the computing system 2100 are not limited thereto.

As described above, the demosaicing method and the demosaicing device according to example embodiments may reduce image artifact and enhance image quality. Image quality may be enhanced by generating the color difference images using the artificial neural network having enhanced nonlinearity and by restoring the demosaiced color images simultaneously based on the color difference images.

As will be appreciated by one skilled in the art, embodiments of the present disclosure may be embodied as a system, method, computer program product, or a computer program product embodied in one or more computer readable medium(s) having computer readable program code embodied thereon. The computer readable program code may be provided to a processor of a general purpose computer, special purpose computer, or other programmable data processing apparatus. The computer readable medium may be a computer readable signal medium or a computer readable storage medium. The computer readable storage medium may be any tangible medium that can contain, or store a program for use by or in connection with an instruction execution system, apparatus, or device.

The inventive concept(s) described herein may be applied to any electronic devices and systems requiring image processing. For example, the inventive concept(s) described herein may be applied to systems such as a computer, a mobile phone, a smart phone, a personal digital assistant (PDA), a portable multimedia player (PMP), a digital camera, a camcorder, a personal computer (PC), a server computer, a workstation, a laptop computer, a digital TV, a set-top box, a portable game console, a navigation system, a wearable device, an internet of things (IoT) device, an internet of everything (IoE) device, an e-book, a virtual reality (VR) device, an augmented reality (AR) device, a vehicle navigation device, a video phone, a monitoring system, an auto focusing system, a tracking system, and a motion detection system, etc.

The foregoing is illustrative of example embodiments and is not to be construed as limiting thereof. Although a few example embodiments have been described, those skilled in the art will readily appreciate that many modifications are possible in the example embodiments without materially departing from the inventive concept(s) described herein.

What is claimed is:

1. A demosaicing method based on deep learning, comprising:
providing an artificial neural network configured to convert a mosaic image representable by pixels with color pixel values corresponding to a plurality of colors to a plurality of color difference images corresponding to the plurality of colors;
simultaneously generating a plurality of output color difference images corresponding to the plurality of colors based on an input mosaic image representable by pixels with color pixel values corresponding to the plurality of colors using the artificial neural network, wherein the plurality of output color difference images include a red color difference image configured to restore a demosaiced red image, a green color difference image configured to restore a demosaiced green image, and a blue color difference image configured to restore a demosaiced blue image; and generating a plurality of demosaiced color images corresponding to the plurality of colors by summing, pixel by pixel, the input mosaic image and each of the plurality of output color difference images.

2. The demosaicing method of claim 1, wherein each color pixel value of the plurality of demosaiced color images corresponds to a sum of each color difference pixel value of the plurality of output color difference images and each color pixel value of the input mosaic image.

3. The demosaicing method of claim 1, wherein with respect to color difference pixel values of an output color difference image corresponding to a first color,
a color difference pixel value corresponding to a first color pixel value of the input mosaic image has a value of zero, and
a color difference pixel value corresponding to a second color pixel of the input mosaic image has a value corresponding to a difference between a first color component and a second color component.

4. The demosaicing method of claim 1,
wherein the plurality of colors include a red color, a green color, and a blue color, and
wherein the plurality of demosaiced color images include the demosaiced red image corresponding to the red color, the demosaiced green image corresponding to the green color and the demosaiced blue image corresponding to the blue color.

5. The demosaicing method of claim 1, wherein generating the plurality of demosaiced color images includes:
generating red pixel values of the demosaiced red image by summing, pixel by pixel, color difference pixel values of the red color difference image and the color pixel values of the input mosaic image;
generating green pixel values of the demosaiced green image by summing, pixel by pixel, color difference pixel values of the green color difference image and the color pixel values of the input mosaic image; and
generating blue pixel values of the demosaiced blue image by summing, pixel by pixel, color difference pixel values of the blue color difference image and the color pixel values of the input mosaic image.

6. The demosaicing method of claim 1, wherein with respect to color difference pixel values of the red color difference image,
a color difference pixel value corresponding to a red pixel value of the input mosaic image has a value of zero,
a color difference pixel value corresponding to a green pixel value of the input mosaic image has a value corresponding to a difference between a red component and a green component, and
a color difference pixel value corresponding to a blue pixel value of the input mosaic image has a value corresponding to a difference between a red component and a blue component.

7. The demosaicing method of claim 1, wherein with respect to color difference pixel values of the green color difference image,
a color difference pixel value corresponding to a red pixel value of the input mosaic image has a value corresponding to a difference between a green component and a red component,
a color difference pixel value corresponding to a green pixel value of the input mosaic image has a value of zero, and
a color difference pixel value corresponding to a blue pixel value of the input mosaic image has a value corresponding to a difference between a green component and a blue component.

8. The demosaicing method of claim 1, wherein with respect to color difference pixel values of the blue color difference image,
a color difference pixel value corresponding to a red pixel value of the input mosaic image has a value corresponding to a difference between a blue component and a red component,
a color difference pixel value corresponding to a green pixel value of the input mosaic image has a value corresponding to a difference between a blue component and a green component, and
a color difference pixel value corresponding to a blue pixel value of the input mosaic image has a value of zero.

9. The demosaicing method of claim 1, wherein the artificial neural network simultaneously generates the red color difference image, the green color difference image, and the blue color difference image by performing a nonlinear operation on red pixel values, green pixel values and blue pixel values of the input mosaic image.

10. The demosaicing method of claim 1, wherein providing the artificial neural network includes:
providing a plurality of original color images corresponding to the plurality of colors;
generating the mosaic image based on the plurality of original color images;
generating the plurality of color difference images based on the mosaic image using the artificial neural network; and
updating parameters of the artificial neural network based on the plurality of original color images and the plurality of color difference images.

11. The demosaicing method of claim 10, wherein updating the parameters of the artificial neural network includes:
generating a plurality of original color difference images corresponding to the plurality of colors based on the plurality of original color images;
comparing the plurality of original color difference images and the plurality of color difference images; and
adjusting the parameters of the artificial neural network based on a result of the comparing.

12. The demosaicing method of claim 11, wherein adjusting the parameters of the artificial neural network includes:
generating a loss value based on values obtained by subtracting, pixel by pixel, color difference pixel values of the plurality of color difference images from color difference pixel values of the plurality of original color difference images; and
adjusting the parameters of the artificial neural network such that the loss value is minimized.

13. The demosaicing method of claim 1, wherein the mosaic image and the input mosaic image have a Bayer pattern.

14. The demosaicing method of claim 1, wherein the mosaic image and the input mosaic image have a Tetra pattern or a Nona pattern.

15. A demosaicing device, comprising:
a memory that stores an artificial neural network configured to simultaneously generate a plurality of output color difference images corresponding to a plurality of colors based on an input mosaic image representable by pixels with color pixel values corresponding to the plurality of colors;

and an adder circuit configured to generate a plurality of demosaiced color images corresponding to the plurality of colors by summing, pixel by pixel, the input mosaic image and each of the plurality of output color difference images, wherein the plurality of output color difference images include a red color difference image configured to restore a demosaiced red image, a green color difference image configured to restore a demosaiced green image, and a blue color difference image configured to restore a demosaiced blue image.

16. The demosaicing device of claim 15, wherein the adder circuit is configured to generate color pixel values of the plurality of demosaiced color images by summing, pixel by pixel, color difference pixel values of the plurality of output color difference images and the color pixel values of the input mosaic image.

17. The demosaicing device of claim 15, wherein the adder circuit includes:
- a red color adder configured to generate red pixel values of the demosaiced red image by summing, pixel by pixel, color difference pixel values of the red color difference image and the color pixel values of the input mosaic image;
- a green color adder configured to generate green pixel values of the demosaiced green image by summing, pixel by pixel, color difference pixel values of the green color difference image and the color pixel values of the input mosaic image; and
- a blue color adder configured to generate blue pixel values of the demosaiced blue image by summing, pixel by pixel, color difference pixel values of the blue color difference image and the color pixel values of the input mosaic image.

18. The demosaicing device of claim 17, wherein the artificial neural network is a convolutional neural network (CNN) having an encoder-decoder structure.

19. The demosaicing device of claim 17, wherein the artificial neural network is configured to simultaneously generate the red color difference image, the green color difference image and the blue color difference image by performing a nonlinear operation on red pixel values, green pixel values and blue pixel values of the input mosaic image.

20. A demosaicing method based on deep learning, comprising:
- providing an artificial neural network configured to convert a mosaic image representable by pixels with red pixel values, green pixel values and blue pixel values to three color difference images corresponding to a red color, a green color, and a blue color;
- simultaneously generating three output color difference images corresponding to the red color, the green color and the blue color based on an input mosaic image representable by pixels with red pixel values, green pixel values and blue pixel values using the artificial neural network, wherein the three output color difference images include a red color difference image configured to restore a demosaiced red image, a green color difference image configured to restore a demosaiced green image, and a blue color difference image configured to restore a demosaiced blue image; and
- generating the red demosaiced color image, the green demosaiced color image, and the blue demosaiced color image by summing, pixel by pixel, the input mosaic image and each of the three output color difference images.

* * * * *